US008077669B2

(12) United States Patent
Kim

(10) Patent No.: US 8,077,669 B2
(45) Date of Patent: *Dec. 13, 2011

(54) METHOD AND SYSTEM FOR ADAPTIVE MODULATIONS AND SIGNAL FIELD FOR CLOSED LOOP MULTIPLE INPUT MULTIPLE OUTPUT (MIMO) WIRELESS LOCAL AREA NETWORK (WLAN) SYSTEM

(75) Inventor: Joonsuk Kim, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/952,275

(22) Filed: Nov. 23, 2010

(65) Prior Publication Data

US 2011/0069778 A1 Mar. 24, 2011

Related U.S. Application Data

(63) Continuation of application No. 11/115,804, filed on Apr. 26, 2005, now Pat. No. 7,839,819, which is a continuation-in-part of application No. 11/110,241, filed on Apr. 20, 2005, now Pat. No. 7,924,943.

(60) Provisional application No. 60/650,941, filed on Feb. 7, 2005.

(51) Int. Cl.
*H04W 4/00* (2009.01)
*H04J 3/22* (2006.01)
*H04W 72/00* (2009.01)

(52) U.S. Cl. ............... 370/329; 370/465; 455/452.2

(58) Field of Classification Search ............. 370/310, 370/328, 329, 340, 341, 464, 465; 455/422.1, 455/445, 450, 451, 452.1, 452.2
See application file for complete search history.

(56) References Cited

U.S. PATENT DOCUMENTS

| 5,070,536 | A | 12/1991 | Mahany et al. |
|---|---|---|---|
| 5,425,051 | A | 6/1995 | Mahany |
| 6,873,606 | B2 | 3/2005 | Agrawal et al. |
| 7,184,713 | B2 | 2/2007 | Kadous et al. |
| 7,239,659 | B2 | 7/2007 | Thomas et al. |
| 2003/0125040 | A1 | 7/2003 | Walton et al. |
| 2005/0085236 | A1 | 4/2005 | Gerlach et al. |
| 2005/0111376 | A1 | 5/2005 | Raghothaman et al. |
| 2005/0201296 | A1 | 9/2005 | Vannithamby et al. |

(Continued)

OTHER PUBLICATIONS

Christopher J. Hansen, IEEE 802.11 Wireless LANs WWiSE Proposal: High Throughput Extension to the 802.11 Standard, Dec. 20, 2004.

(Continued)

*Primary Examiner* — Aung S Moe
*Assistant Examiner* — Kerri Rose
(74) *Attorney, Agent, or Firm* — McAdrews, Held & Malloy, Ltd.

(57) ABSTRACT

A method for communicating information is disclosed and includes, in a multiple-input-multiple-output (MIMO) communication system utilizing a plurality of modulation types and a plurality of spatial streams, determining an aggregate noise characteristic based upon a noise characteristic of each of the plurality of spatial streams. A receiver may be configured to receive subsequent data based on one or both of: a current modulation type for modulating a current spatial stream and at least one subsequent modulation type for modulating at least one subsequent spatial stream. The current modulation type and the at least one subsequent modulation type may be based on the determined aggregate noise characteristic. A constellation field may be encoded to uniquely identify a combination comprising the current modulation type, and the at least one subsequent modulation type.

36 Claims, 10 Drawing Sheets

U.S. PATENT DOCUMENTS

2005/0201307 A1 9/2005 Chae et al.
2005/0237971 A1 10/2005 Skraparlis
2005/0245197 A1 11/2005 Kadous et al.
2006/0176972 A1 8/2006 Kim et al.

OTHER PUBLICATIONS

Syed Aon Mujtaba, IEEE 802.11 Wireless LANs TGn Sync Proposal Technical Specification, Jan. 18, 2005.

METHOD AND SYSTEM FOR ADAPTIVE MODULATIONS AND SIGNAL FIELD FOR CLOSED LOOP MULTIPLE INPUT MULTIPLE OUTPUT (MIMO) WIRELESS LOCAL AREA NETWORK (WLAN) SYSTEM

CROSS-REFERENCE TO RELATED APPLICATIONS/INCORPORATION BY REFERENCE

The present application is a continuation of application Ser. No. 11/115,804, filed on Apr. 26, 2005, which is a continuation-in-part of application Ser. No. 11/110,241, filed on Apr. 20, 2005, which claims priority to provisional application No. 60/650,941 filed on Feb. 7, 2005. This application also makes reference, claims priority to, and claims the benefit of U.S. Provisional Application Ser. No. 60/656,357 filed Feb. 25, 2005.

This application makes reference to:
U.S. patent application Ser. No. 11/061,567 filed Feb. 18, 2005;
U.S. patent application Ser. No. 11/052,389 filed Feb. 7, 2005; and
U.S. patent application Ser. No. 11/052,353 filed Feb. 7, 2005.
U.S. patent application Ser. No. 11/110,241 filed Apr. 20, 2005.

All of the above stated applications are hereby incorporated herein by reference in their entirety.

FIELD OF THE INVENTION

Certain embodiments of the invention relate to wireless communication. More specifically, certain embodiments of the invention relate to a method and system for an adaptive modulations and signal field for a closed loop multiple input multiple output (MIMO) wireless local area network (WLAN) system.

BACKGROUND OF THE INVENTION

The Institute for Electrical and Electronics Engineers (IEEE), in resolution IEEE 802.11, also referred as "802.11", has defined a plurality of specifications which are related to wireless networking. With current existing 802.11 standards, such as 802.11(a), (b), (g), which can support up to 54 Mbps data rates, either in 2.4 GHz or in 5 GHz frequency bands, the IEEE standards body created a new task group, 802.11n, to support higher than 100 Mbps data rates. Among them are being discussed specifications for "closed loop" feedback mechanisms by which a receiving station may feed back information to a transmitting station to assist the transmitting station in adapting signals, which are sent to the receiving station.

In closed loop feedback systems, a transmitting station may utilize feedback information from a receiving station to transmit subsequent signals in what is called "beamforming". Beamforming is a technique to steer signals to a certain direction for the receiver to receive it more reliably with less noise and interference. Compounded with demands for new features and capabilities, various proposals for new 802.11n based feedback mechanisms are emerging to address the demand for these new features and capabilities. For example, there exists a demand for the introduction of new capabilities, which may enable a receiving mobile terminal to feedback pertinent information to a transmitting mobile terminal. This feedback of pertinent information may enable the transmitting mobile terminal to adapt its mode of transmission based upon the feedback information provided by the receiving mobile terminal. As with any communication system, a major goal is to enable the transmitting mobile station to achieve a higher information transfer rate to the receiving mobile terminal, while simultaneously achieving a lower packet error rate (PER). Notwithstanding, there are no existing methodologies that adequately address these shortcomings and/or satisfy the demand for these new features and capabilities in WLANs.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for an adaptive modulations and signal field for a closed loop multiple input multiple output (MIMO) wireless local area network (WLAN) system, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Figure 1:
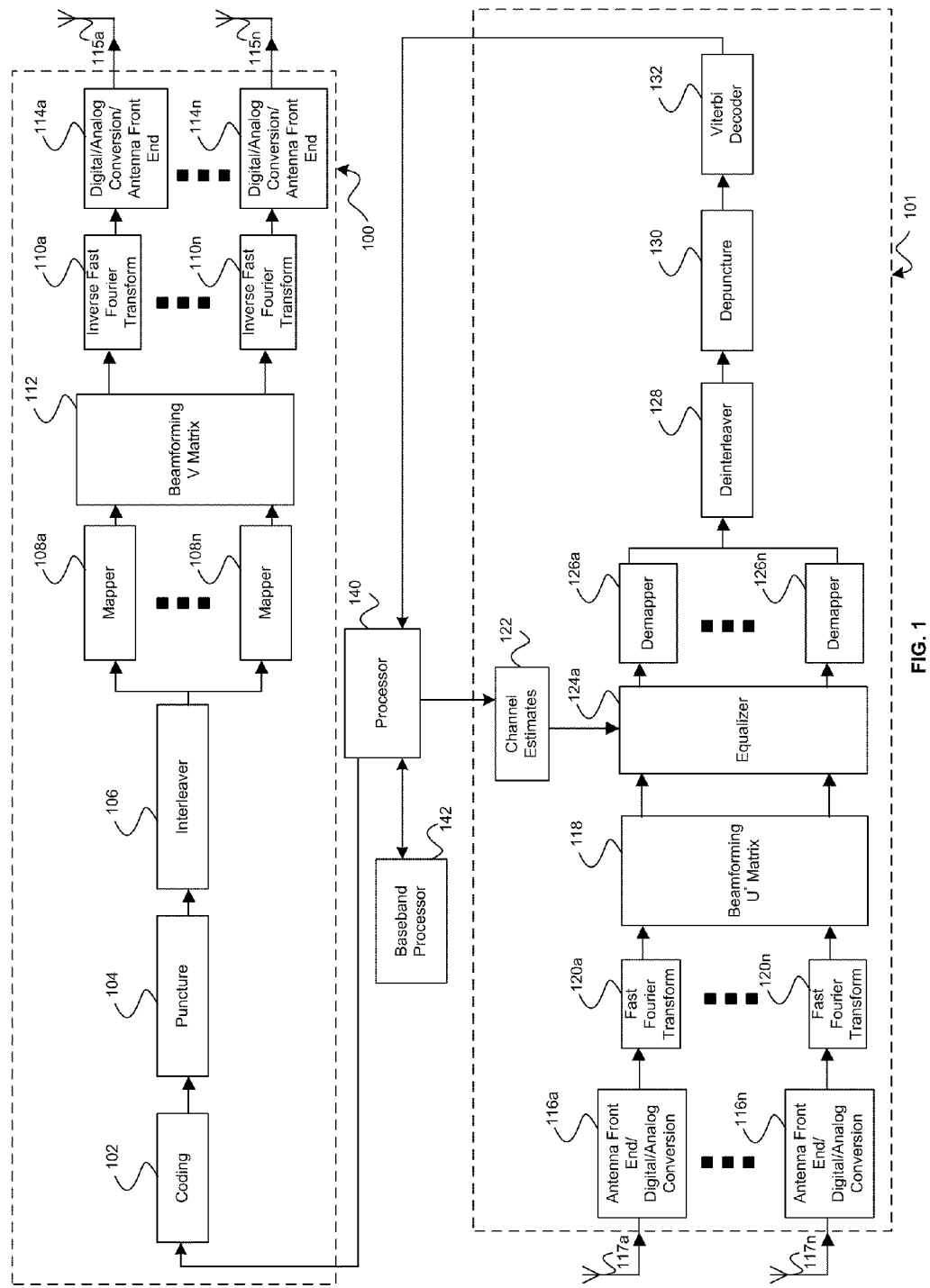
FIG. 1 is an exemplary block diagram of a transceiver comprising a transmitter and a receiver in a MIMO system, which may be utilized in accordance with an embodiment of the invention.

Certain embodiments of the invention relate to a method and system for an optional closed loop mechanism with adaptive modulations for a multiple input multiple output (MIMO) wireless local area network (WLAN) system. In accordance with an embodiment of the invention, a channel sounding mechanism may be utilized to communicate information between a transmitter and a receiver. Various embodiments of the invention may utilize properties of Eigenvalue analysis of MIMO systems to reduce the number of bits of binary information required to encode a modulation type among a plurality of modulation types to a spatial stream among a plurality of spatial streams. The reduction in the number of required bits in various embodiments of the invention compared to other conventional approaches may enable greater flexibility in systems that utilize closed loop feedback mechanisms. Various embodiments of the invention may utilize a new channel sounding mechanism in a closed loop system that enables adaptive modulation and beamforming. Modulation types and coding rates may be chosen adaptively per-stream based on ranges in the values of SNRs. The transmitter may choose modulation types and coding rates based on channel feedback information.

In accordance with an embodiment of the invention, with regard to channel information, MIMO systems may utilize the channel more efficiently based on observable criteria. In an example of observable criteria, RF channels that are characterized by higher signal to noise ratios (SNR) may support higher data transfer rates than RF channels with lower SNR. Eigenbeamforming, or "beamforming", may be utilized with systems that support the exchange of feedback information from a receiver to a transmitter (or "closed loop" systems) to "steer beams" which may enable signal energy to be focused in a desired direction. Any of a plurality of RF channels which may be utilized by a transmitter to communicate with a receiver may be referred to as "downlink channels", while any of a plurality of RF channels which may be utilized by a receiver to communicate with a transmitter may be referred to as "uplink channels".

Adaptive modulation and coding rate techniques may be utilized with beamforming techniques such that a plurality of signals, or "streams", may be transmitted simultaneously that comprise different amounts of data. This technique may also be known as streamloading. The modulation and/or coding rate may be chosen per stream efficiently, with either or both capable of being modified, based on channel information.

In one aspect of the invention, modulation and/or coding schemes may be selected on a per-stream basis to maximize the aggregate information transfer rate while minimizing packet error rates (PER) for information transmitted simultaneously via a plurality of RF channels. This may entail evaluating the SNR performance of individual RF channels, and adapting the modulation and/or coding scheme for each RF channel based on SNR, and data rate maximization criteria. Exemplary measures of signal quality may comprise, for example, SNR and PER.

FIG. 1 is an exemplary block diagram of transceiver comprising a transmitter and a receiver in a MIMO system, which may be utilized in accordance with an embodiment of the invention. FIG. 1 shows transceiver comprising a transmitter 100, a receiver 101, a processor 140, a baseband processor 142, a plurality of transmitter antennas 115a . . . 115n, and a plurality of receiver antennas 117a . . . 117n. The transmitter 100 may comprise a coding block 102, a puncture block 104, an interleaver block 106, a plurality of mapper blocks 108a . . . 108n, a plurality of inverse fast Fourier transform (IFFT) blocks 110a . . . 110n, a beamforming V matrix block 112, and a plurality of digital to analog (D to A) conversion and antenna front end blocks 114a . . . 114n. The receiver 101 may comprise a plurality of antenna front end and analog to digital (A to D) conversion blocks 116a . . . 116n, a beamforming U* matrix block 118, a plurality of fast Fourier transform (FFT) blocks 120a . . . 120n, a channel estimates block 122, an equalizer block 124, a plurality of demapper blocks 126a . . . 126n, a deinterleaver block 128, a depuncture block 130, and a Viterbi decoder block 132.

The variables V and U* in beamforming blocks 112 and 118 respectively refer to matrices utilized in the beamforming technique. U.S. application Ser. No. 11/052,389 filed Feb. 7, 2005, provides a detailed description of Eigenbeamforming, which is hereby incorporated herein by reference in its entirety.

The processor 140 may perform digital receiver and/or transmitter functions in accordance with applicable communications standards. These functions may comprise, but are not limited to, tasks performed at lower layers in a relevant protocol reference model. These tasks may further comprise the physical layer convergence procedure (PLCP), physical medium dependent (PMD) functions, and associated layer management functions. The baseband processor 142 may similarly perform functions in accordance with applicable communications standards. These functions may comprise, but are not limited to, tasks related to analysis of data received via the receiver 101, and tasks related to generating data to be transmitted via the transmitter 100. These tasks may further comprise medium access control (MAC) layer functions as specified by pertinent standards.

In the transmitter 100, the coding block 102 may transform received binary input data blocks by applying a forward error correction (FEC) technique, for example, binary convolutional coding (BCC). The application of FEC techniques, also known as "channel coding", may improve the ability to successfully recover transmitted data at a receiver by appending redundant information to the input data prior to transmission via an RF channel. The ratio of the number of bits in the binary input data block to the number of bits in the transformed data block may be known as the "coding rate". The coding rate may be specified using the notation $i_b/t_b$, where $t_b$ represents the total number of bits that comprise a coding group of bits, while $i_b$ represents the number of information bits that are contained in the group of bits $t_b$. Any number of bits $t_b-i_b$ may represent redundant bits that may enable the receiver 101 to detect and correct errors introduced during transmission. Increasing the number of redundant bits may enable greater capabilities at the receiver to detect and correct errors in information bits. The penalty for this additional error detection and correction capability may result in a reduction in the information transfer rates between the transmitter 100 and the receiver 101. The invention is not limited to BCC, and any one of a plurality of coding techniques, for example, Turbo coding or low density parity check (LDPC) coding, may also be utilized.

The puncture block 104 may receive transformed binary input data blocks from the coding block 102 and alter the coding rate by removing redundant bits from the received transformed binary input data blocks. For example, if the coding block 102 implemented a ½ coding rate, 4 bits of data received from the coding block 102 may comprise 2 information bits, and 2 redundant bits. By eliminating 1 of the redundant bits in the group of 4 bits, the puncture block 104 may adapt the coding rate from ½ to ⅔. The interleaver block 106 may rearrange bits received in a coding rate-adapted data block from the puncture block 104 prior to transmission via an RF channel to reduce the probability of uncorrectable corruption of data due to burst of errors, impacting contiguous bits, during transmission via an RF channel. The output from the interleaver block 106 may also be divided into a plurality of streams where each stream may comprise a non-overlapping portion of the bits from the received coding rate-adapted data block. Therefore, for a given number of bits in the coding rate-adapted data block, $b_{db}$, a given number of streams from the interleaver block 106, $n_{st}$, and a given number of bits assigned to an individual stream i by the interleaver block 106, $b_{st}(i)$:

$$b_{db} = \sum_{i=0}^{n_{st}-1} b_{st}(i) \quad \text{equation [1]}$$

For a given number of coded bits before interleaving, $b_{db}$, each bit may be denoted by an index, k=0, 1 ... $b_{db}$−1. The interleaver block 106 may assign bits to the first spatial stream, spatial stream 0, $b_{st}(0)$, for bit indexes k=0, $n_{st}$, 2*$n_{st}$, ..., $b_{db}$−$n_{st}$. The interleaver block 106 may assign bits to spatial stream 1, $b_{st}(1)$, for bit indexes k=1, $n_{st}$+1, 2*$n_{st}$+1, ..., $b_{db}$−$n_{st}$+1. The interleaver block 106 may assign bits to spatial stream 2, $b_{st}(2)$, for bit indexes k=2, $n_{st}$+2, 2*$n_{st}$+2, ..., $b_{db}$−$n_{st}$+2. The interleaver block 106 may assign bits to spatial stream $n_{st}$, $b_{st}(n_{st})$, for bit indexes k=$n_{st}$−1, 2*$n_{st}$−1, 3*$n_{st}$−1, ..., $b_{db}$−1.

The plurality of mapper blocks 108a ... 108n may comprise a number of individual mapper blocks that is equal to the number of individual streams generated by the interleaver block 106. Each individual mapper block 108a ... 108n may receive a plurality of bits from a corresponding individual stream, mapping those bits into a "symbol" by applying a modulation technique based on a "constellation" utilized to transform the plurality of bits into a signal level representing the symbol. The representation of the symbol may be a complex quantity comprising in-phase (I) and quadrature (Q) components. The mapper block 108a ... 108n for stream i may utilize a modulation technique to map a plurality of bits, $b_{st}(i)$, into a symbol.

The beamforming V matrix block 112 may apply the beamforming technique to the plurality of symbols, or "spatial modes", generated from the plurality of mapper blocks 108a ... 108n. The beamforming V matrix block 112 may generate a plurality of signals where the number of signals generated may be equal to the number of transmitting antenna at the transmitter 100. Each signal in the plurality of signals generated by the beamforming V block 112 may comprise a weighted sum of at least one of the received symbols from the mapper blocks 108a ... 108n.

The plurality of IFFT blocks 110a ... 110n may receive a plurality of signals from the beamforming block 112. Each IFFT block 110a ... 110n may subdivide the bandwidth of the RF channel into a plurality of n sub-band frequencies to implement orthogonal frequency division multiplexing (OFDM), buffering a plurality of received signals equal to the number of sub-bands. Each buffered signal may be modulated by a carrier signal whose frequency is based on that of one of the sub-bands. Each of the IFFT blocks 110a ... 110n may then independently sum their respective buffered and modulated signals across the frequency sub-bands to perform an n-point IFFT thereby generating a composite OFDM signal.

The plurality of digital (D) to analog (A) conversion and antenna front end blocks 114a ... 114n may receive the plurality of signals generated by the plurality of IFFT blocks 110a ... 110n. The digital signal representation received from each of the plurality of IFFT blocks 110a ... 110n may be converted to an analog RF signal that may be amplified and transmitted via an antenna. The plurality of D to A conversion and antenna front end blocks 114a ... 114n may be equal to the number of transmitting antenna 115a ... 115n. Each D to A conversion and antenna front end block 114a ... 114n may receive one of the plurality of signals from the beamforming V matrix block 112 and may utilize an antenna 115a ... 115n to transmit one RF signal via an RF channel.

In the receiver 101, the plurality of antenna front end and A to D conversion blocks 116a ... 116n may receive analog RF signals via an antenna, converting the RF signal to baseband and generating a digital equivalent of the received analog baseband signal. The digital representation may be a complex quantity comprising I and Q components. The number of antenna front end and A to D conversion blocks 116a ... 116n may be equal to the number of receiving antenna 117a ... 117n.

The plurality of FFT blocks 120a ... 120n may receive a plurality of signals from the plurality of antenna front end and A to D conversion blocks 116a ... 116n. The plurality of FFT blocks 120a ... 120n may be equal to the number of antenna front end and A to D conversion blocks 116a ... 116n. Each FFT block 120a ... 120n may receive a signal from an antenna front end and A to D conversion block 116a ... 116n, independently applying an n-point FFT technique, and demodulating the signal by a utilizing a plurality of carrier signals based on the n sub-band frequencies utilized in the transmitter 100. The demodulated signals may be mathematically integrated over one sub band frequency period by each of the plurality of FFT blocks 120a ... 120n to extract n symbols contained in each of the plurality of OFDM signals received by the receiver 101.

The beamforming U* block 118 may apply the beamforming technique to the plurality of signals received from the plurality of FFT blocks 120a ... 120n. The beamforming U* block 118 may generate a plurality of signals where the number of signals generated may be equal to the number of spatial streams utilized in generating the signals at the transmitter 100. Each of the plurality of signals generated by the beamforming U* block 118 may comprise a weighted sum of at least one of the signals received from the FFT blocks 120a ... 120n.

The channel estimates block 122 may utilize preamble information, contained in a received RF signal, to compute channel estimates. The equalizer block 124 may receive signals generated by the beamforming U* block 118. The equalizer block 124 may process the received signals based on input from the channel estimates block 122 to recover the symbol originally generated by the transmitter 100. The equalizer block 124 may comprise suitable logic, circuitry, and/or code that may be adapted to transform symbols received from the beamforming U* block 118 to compensate for fading in the RF channel.

The plurality of demapper blocks 126a ... 126n may receive symbols from the equalizer block 124, reverse mapping each symbol to one or more binary bits by applying a demodulation technique, based on the modulation technique utilized in generating the symbol at the transmitter 100. The plurality of demapper blocks 126a . . . 126n may be equal to the number of streams in the transmitter 100.

The deinterleaver block 128 may receive a plurality of bits from each of the demapper blocks 126a . . . 126n, rearranging the order of bits among the received plurality of bits. The deinterleaver block 128 may rearrange the order of bits from the plurality of demapper blocks 126a . . . 126n in, for example, the reverse order of that utilized by the interleaver 106 in the transmitter 100. The depuncture block 130 may insert "null" bits into the output data block received from the deinterleaver block 128 that were removed by the puncture block 104. The Viterbi decoder block 132 may decode a depunctured output data block, applying a decoding technique that may recover the binary data blocks that were input to the coding block 102.

In operation, the processor 140 may receive decoded data from the Viterbi decoder 132. The processor 140 may communicate received data to the baseband processor 142 for analysis and further processing. The processor 140 may also communicate data received via the RF channel, by the receiver 101, to the channel estimates block 122. This information may be utilized by the channel estimates block 122, in the receiver 101, to compute channel estimates for a received RF channel. The baseband processor 142 may generate data to be transmitted via an RF channel by the transmitter 100. The baseband processor 142 may communicate the data to the processor 140. The processor 140 may generate a plurality of bits that are communicated to the coding block 102.

The elements shown in FIG. 1 may comprise components that may be present in an exemplary embodiment of a wireless communications terminal. One exemplary embodiment of a may be a wireless communications transmitter comprising a transmitter 100, a processor 140, and a baseband processor 142. Another exemplary embodiment of a may be a wireless communications receiver comprising a receiver 101, a processor 140, and a baseband processor 142. Another exemplary embodiment of a may be a wireless communications transceiver comprising a transmitter 100, a receiver 101, a processor 140, and a baseband processor 142.

Figure 2A:
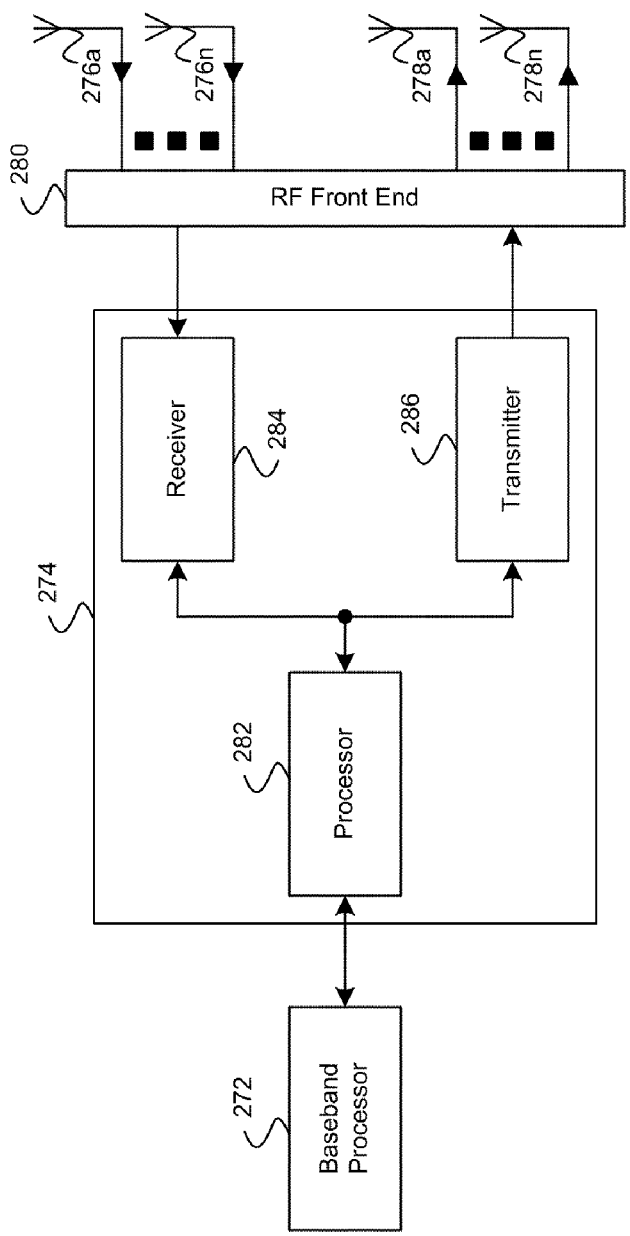
FIG. 2a is an exemplary block diagram of communications circuitry that may be utilized in accordance with an embodiment of the invention.

FIG. 2a is an exemplary block diagram of communications circuitry that may be utilized in accordance with an embodiment of the invention. With reference to FIG. 2a is shown a baseband processor 272, a transceiver 274, an RF front end 280, a plurality of receive antennas 276a, . . . , 276n, and a plurality of transmitting antennas 278a, . . . , 278n. The transceiver 274 may comprise a processor 282, a receiver 284, and a transmitter 286.

The processor 282 may be adapted to perform digital receiver and/or transmitter functions in accordance with applicable communications standards. These functions may comprise, but are not limited to, tasks performed at lower layers in a relevant protocol reference model. These tasks may further comprise the physical layer convergence procedure (PLCP), physical medium dependent (PMD) functions, and associated layer management functions. The baseband processor 272 may be adapted to perform functions in accordance with applicable communications standards. These functions may comprise, but are not limited to, tasks related to analysis of data received via the receiver 284, and tasks related to generating data to be transmitted via the transmitter 286. These tasks may further comprise medium access control (MAC) layer functions as specified by pertinent standards.

The receiver 284 may be adapted to perform digital receiver functions that may comprise, but are not limited to, fast Fourier transform processing, beamforming processing, equalization, demapping, demodulation control, deinterleaving, depuncture, and decoding. The transmitter 286 may perform digital transmitter functions that comprise, but are not limited to, coding, puncture, interleaving, mapping, modulation control, inverse fast Fourier transform processing, beamforming processing. The RF front end 280 may receive analog RF signals via antennas 276a, . . . , 276n, converting the RF signal to baseband and generating a digital equivalent of the received analog baseband signal. The digital representation may be a complex quantity comprising I and Q components. The RF front end 280 may also transmit analog RF signals via an antenna 278a, . . . , 278n, converting a digital baseband signal to an analog RF signal.

In operation, the processor 282 may receive data from the receiver 284. The processor 282 may communicate received data to the baseband processor 272 for analysis and further processing. The baseband processor 272 may generate data to be transmitted via an RF channel by the transmitter 286. The baseband processor 272 may communicate the data to the processor 282. The processor 282 may generate a plurality of bits that are communicated to the receiver 284. The processor 282 may generate signals to control the operation of the modulation process in the transmitter 286, and of the demodulation process in the receiver 284.

Figure 2B:
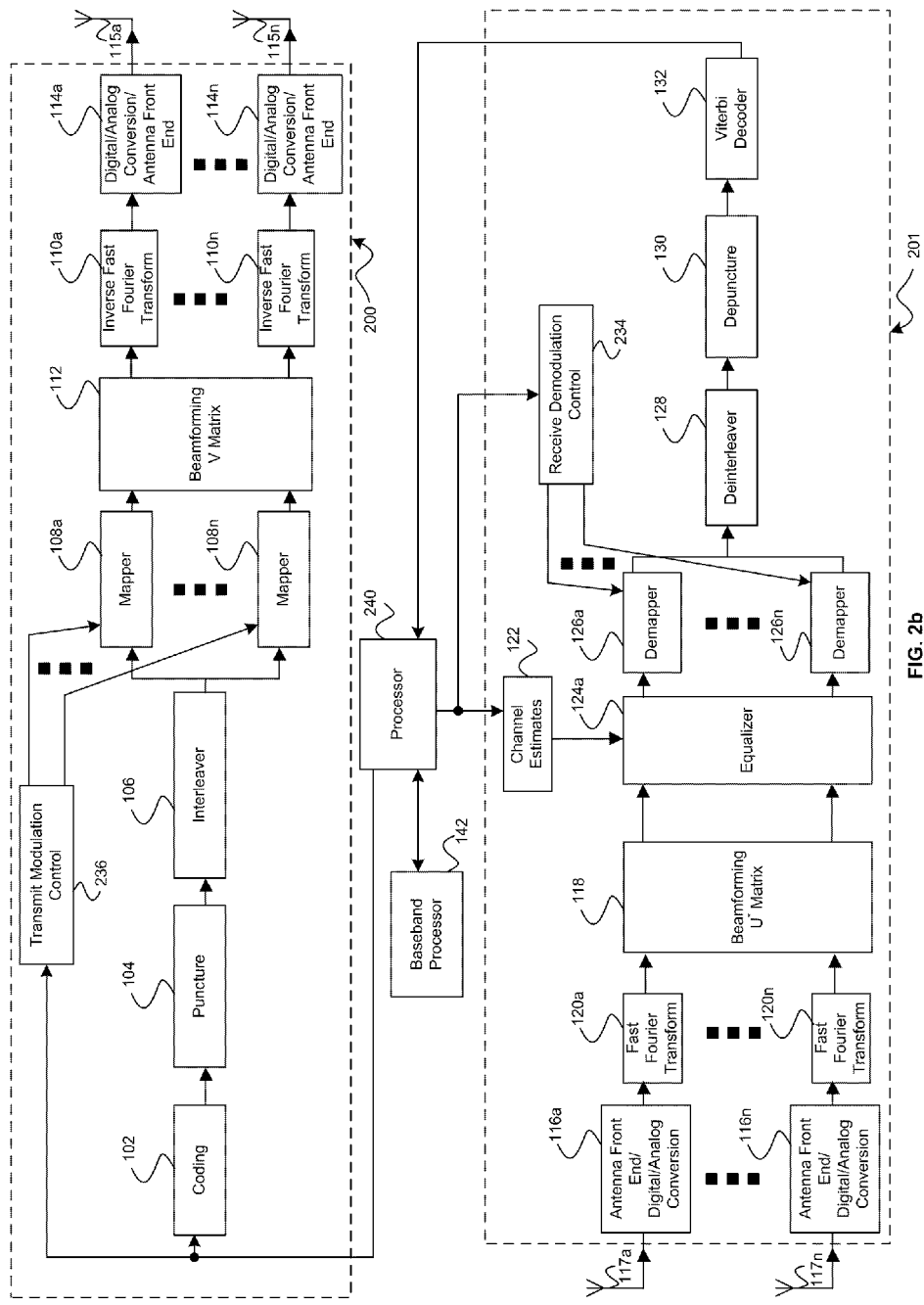
FIG. 2b is an exemplary block diagram of a transceiver comprising transmitter and a receiver with adaptive modulation/demodulation for a MIMO system, which may be utilized in accordance with an embodiment of the invention.

FIG. 2b is an exemplary block diagram of a transceiver comprising transmitter and a receiver with adaptive modulation/demodulation for a MIMO system, which may be utilized in accordance with an embodiment of the invention. With reference to FIG. 2b is shown a transmitter 200, a receiver 201, a processor 240, a baseband processor 142, a plurality of transmitter antennas 115a . . . 115n, and a plurality of receiver antennas 117a . . . 117n. The transmitter 200 may comprise a transmit modulation control block 236, a coding block 102, a puncture block 104, an interleaver block 106, a plurality of mapper blocks 108a . . . 108n, a plurality of inverse fast Fourier transform (IFFT) blocks 110a . . . 110n, a beamforming V matrix block 112, and a plurality of digital to analog (D to A) conversion and antenna front end blocks 114a . . . 114n. The receiver 201 may comprise a receive demodulation control block 234, a plurality of antenna front end and analog to digital (A to D) conversion blocks 116a . . . 116n, a beamforming U* matrix block 118, a plurality of fast Fourier transform (FFT) blocks 120a . . . 120n, a channel estimates block 122, an equalizer block 124, a plurality of demapper blocks 126a . . . 126n, a deinterleaver block 128, a depuncture block 130, and a Viterbi decoder block 132. The transmit modulation control block 236 may enable control over the selection of modulation techniques utilized in the transmitter 200. The receive demodulation control block 234 may enable control over the selection of demodulation techniques utilized in the receiver 201. In operation, the transmit modulation control block 236 may enable control of modulation techniques applied by each of the plurality of mapper blocks 108a . . . 108n individually, on a per-stream basis. The receive demodulation control block 234 may enable control of demodulation techniques applied by each of the plurality of demapper blocks 126a . . . 126n individually, on a per-stream basis.

The processor 240 may perform digital receiver and/or transmitter functions in accordance with applicable communications standards. These functions may comprise, but are not limited to, tasks performed at lower layers in a relevant protocol reference model. These tasks may further comprise the physical layer convergence procedure (PLOP), physical medium dependent (PMD) functions, and associated layer management functions.

In operation, per-stream control of the mapper blocks 108a . . . 108n may control the number of bits assigned to one or more individual streams, $b_{st}(i)$, to ensure that the sum of bits across the plurality of streams equals the aggregate number of bits in the coding rate-adapted data block, $b_{db}$, as shown in equation[1]. The processor 240 may receive decoded data from the Viterbi decoder 132. The processor 240 may communicate received data to the baseband processor 142 for analysis and further processing. The processor 240 may also communicate data received via the RF channel, by the receiver 101, to the channel estimates block 122. This information may be utilized by the channel estimates block 122, in the receiver 101, to compute channel estimates for a received RF channel. The baseband processor 142 may generate data to be transmitted via an RF channel by the transmitter 100. The baseband processor 142 may communicate the data to the processor 240. The processor 240 may generate a plurality of bits that are communicated to the coding block 102. The processor 240 may generate signals to control the operation of the transmit modulation control block 236, and of the receive demodulation control block 234.

The elements shown in FIG. 2b may comprise components that may be present in an exemplary embodiment of a wireless communications terminal. One exemplary embodiment of a may be a wireless communications transmitter comprising a transmitter 200, a processor 240, and a baseband processor 142. Another exemplary embodiment of a may be a wireless communications receiver comprising a receiver 201, a processor 240, and a baseband processor 142. Another exemplary embodiment of a may be a wireless communications transceiver comprising a transmitter 200, a receiver 201, a processor 240, and a baseband processor 142.

Figure 3:
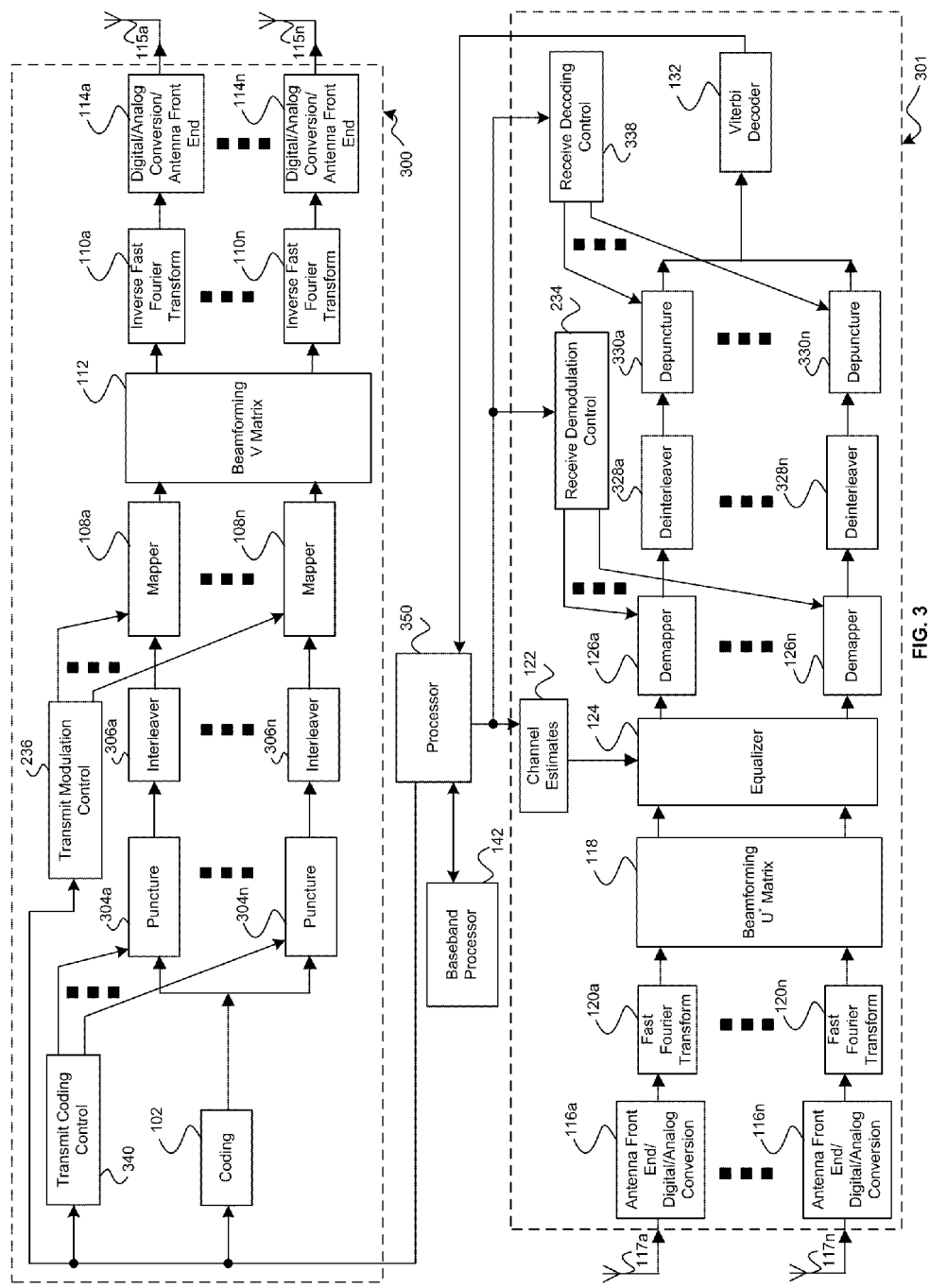
FIG. 3 is an exemplary block diagram of a transceiver comprising a transmitter and a receiver with adaptive modulation/demodulation and coding/decoding for a MIMO system, which may be utilized in accordance with an embodiment of the invention.

FIG. 3 is an exemplary block diagram of a transceiver comprising a transmitter and a receiver with adaptive modulation/demodulation and coding/decoding for a MIMO system, which may be utilized in accordance with an embodiment of the invention. With reference to FIG. 3 there is shown a transmitter 300, a receiver 301, a processor 350, a baseband processor 142, a plurality of transmitting antennas 115a . . . 115n, and a plurality of receiving antennas 117a . . . 117n. The transmitter 300 may comprise a plurality of puncture blocks 304a, . . . , 304n, a plurality of interleaver blocks 306a, . . . , 306n, a transmit coding control block 340, and a plurality of blocks as shown in the transmitter 200 (FIG. 2b), the coding block 102, the plurality of mapper blocks 108a, . . . , 108n, and the plurality of IFFT blocks 110a, . . . , 110n. The transmitter 300 may further comprise the beamforming V matrix block 112, and the plurality of digital to analog conversion and antenna front end blocks 114a, . . . , 114n, and the transmit modulation control block 236. The receiver 301 may comprise a plurality of deinterleaver blocks 328a, . . . , 328n, a plurality of depuncture blocks 330a, . . . , 330n, a receive coding control block 338, and a plurality of blocks as shown in the receiver 201 (FIG. 2b), the plurality of antenna front end and digital to analog conversion blocks 116a, . . . , 116n, the beamforming U* matrix block 118, and the plurality of FFT blocks 120a, . . . , 120n. The receiver 301 may further comprise the channel estimates block 122, the equalizer block 124, the plurality of demapper blocks 126a, . . . , 126n, and the Viterbi decoder block 132, and the receive demodulation control block 234.

In the transmitter 300, puncture and interleaving may be performed individually on a per-stream basis. The output from the plurality of puncture blocks 304a, . . . , 304n may be communicated to the plurality of interleaver blocks 306a, . . . , 306n. Each puncture block in the plurality 304a, . . . , 304n may communicate its output to a corresponding one of the plurality of interleaver blocks 306a, . . . , 306n. The output from the plurality of interleaver blocks 306a, . . . , 306n may be communicated to the plurality of mapper blocks 108a, . . . , 108n. Each of the plurality of interleaver blocks 306a, . . . , 306n may communicate its output to a corresponding one of the plurality of mapper blocks 108a, . . . , 108n. The transmit coding control block 340 may enable control over the application of puncture utilized in the transmitter 300.

In the receiver 301, depuncture and deinterleaving may be performed individually on a per-stream basis. Each deinterleaver block 328a, . . . , 328n may receive input from a plurality of demapper blocks 126a, . . . , 126n with each of the plurality of deinterleaver blocks 328a, . . . , 328n receiving input from a corresponding one of the plurality of demapper blocks 126a, . . . , 126n. Each depuncture block 330a, . . . , 330n may receive input from a plurality of deinterleaver blocks 328a, . . . , 328n with each of the plurality of depuncture blocks 330a, . . . , 330n receiving input from a corresponding one of the plurality of deinterleaver blocks 328a, . . . , 328n. The output from each of the plurality of depuncture blocks 330a, . . . , 330n may be communicated to the Viterbi decoder block 132. The receive decoding control block 338 may enable control over the application of depuncture utilized in the receiver 301.

The processor 350 may perform digital receiver and/or transmitter functions in accordance with applicable communications standards. These functions may comprise, but are not limited to, tasks performed at lower layers in a relevant protocol reference model. These tasks may further comprise the physical layer convergence procedure (PLOP), physical medium dependent (PMD) functions, and associated layer management functions.

In operation, the transmit coding control block 340 may enable control of puncture applied by each of the plurality of puncture blocks 304a, . . . , 304n individually, on a per-stream basis. The per-stream control of puncture may enable the coding rate to vary on a per-stream basis. The receive coding control block 338 may enable control of depuncture applied by each of the plurality of depuncture blocks 330a, . . . , 330n individually, on a per-stream basis. The per-stream control of depuncture may enable the receiver 301 to adapt to differences in the coding rate of the received signal on a per-stream basis.

The processor 300 may receive decoded data from the Viterbi decoder 132. The processor 240 may communicate received data to the baseband processor 142 for analysis and further processing. The processor 350 may also communicate data received via the RF channel, by the receiver 101, to the channel estimates block 122. This information may be utilized by the channel estimates block 122, in the receiver 101, to compute channel estimates for a received RF channel. The baseband processor 142 may generate data to be transmitted via an RF channel by the transmitter 100. The baseband processor 142 may communicate the data to the processor 3500. The processor 350 may generate a plurality of bits that are communicated to the coding block 102. The processor 350 may generate signals to control the operation of the transmit modulation control block 236, and of the receive demodulation control block 234. The processor 350 may generate signals to control the operation of the transmit coding control block 340, and of the receive decoding control block 338.

The elements shown in FIG. 3 may comprise components that may be present in an exemplary embodiment of a wireless communications terminal. One exemplary embodiment of a may be a wireless communications transmitter comprising a transmitter 300, a processor 340, and a baseband processor 142. Another exemplary embodiment of a may be a wireless communications receiver comprising a receiver 301, a processor 340, and a baseband processor 142. Another exemplary embodiment of a may be a wireless communications transceiver comprising a transmitter 300, a receiver 301, a processor 340, and a baseband processor 142.

In one aspect of the invention, a system for communicating information in a MIMO communications system may comprise a receiver that may be adapted to select, for a plurality of spatial streams, a modulation type and/or coding rate. The receiver may communicate at least one message, via an RF channel, that comprises a plurality of modulation types and/or coding rates. The receiver may be configured to receive subsequent data based on at least one selected modulation type and/or coding rate. In another aspect of the invention, the system may comprise a transmitter that may receive a message, via an RF channel, that comprises a specification of a plurality of modulation types and/or coding rates, for a plurality of spatial streams. The system may be configured to transmit subsequent data based on at least one of the received modulation types and/or coding rates.

Channel sounding may comprise a plurality of methods by which a transmitter, for example, transmitter 200, and a receiver, for example, receiver 201, may exchange information in a closed loop system. The exchanged information may be utilized by a transmitter such that the transmitter may be configured to transmit subsequent data based on a modulation type and/or coding rate. The exchanged information may be utilized to configure the receiver to receive subsequent data based on a modulation type and/or coding rate. Channel sounding may enable the transmitter to transmit, and the receiver to receive, based on a common modulation type and/or coding rate.

A frame structure for channel sounding which may utilize a MIMO mode request frame, a MIMO channel request frame, a MIMO mode response frame, and a MIMO channel response frame are described in U.S. application Ser. No. 11/052,353 filed Feb. 7, 2005, which is hereby incorporated herein by reference in its entirety.

In a MIMO system, various embodiments of the invention may enable a transmitter, for example, transmitter 200, and a receiver, for example, receiver 201, to utilize channel sounding mechanisms to exchange information that specifies a modulation type and/or coding rate for each of a plurality of spatial streams. The exchanged information may be utilized to configure the transmitter to transmit subsequent data via an individual spatial stream among a transmitted plurality of spatial streams based on a modulation type and/or coding rate. The exchanged information may be utilized to configure the receiver to receive subsequent data via a corresponding individual spatial stream among a received plurality of spatial streams based on a modulation type and/or coding rate. Channel sounding may enable the transmitter to transmit via an individual spatial stream, and the receiver to receive via a corresponding individual spatial stream, based on a common modulation type and/or coding rate.

In an open loop MIMO system, a transmitter 100, 200, or 300, and a receiver 101, 201, or 301, may not utilize channel sounding closed loop feedback methods. Instead, the transmitter may utilize a "back off" method to select a modulation type and/or coding rate for a plurality of spatial streams. In an open loop system, the transmitter may select a modulation type and/or coding rate to be utilized in transmitting data to the receiver. If the receiver successfully receives the transmitted data, an acknowledgement may be transmitted. Upon receipt of the acknowledgement, the transmitter may modify a previously selected modulation type and/or coding rate to increase the data rate of subsequent transmitted data. If the receiver does not successfully receive the transmitted data, an acknowledgement may not be transmitted. If the transmitter does not receive an acknowledgement, the transmitter may modify a previously selected modulation type and/or coding rate to decrease the data rate of subsequent transmitted data.

Figure 4:
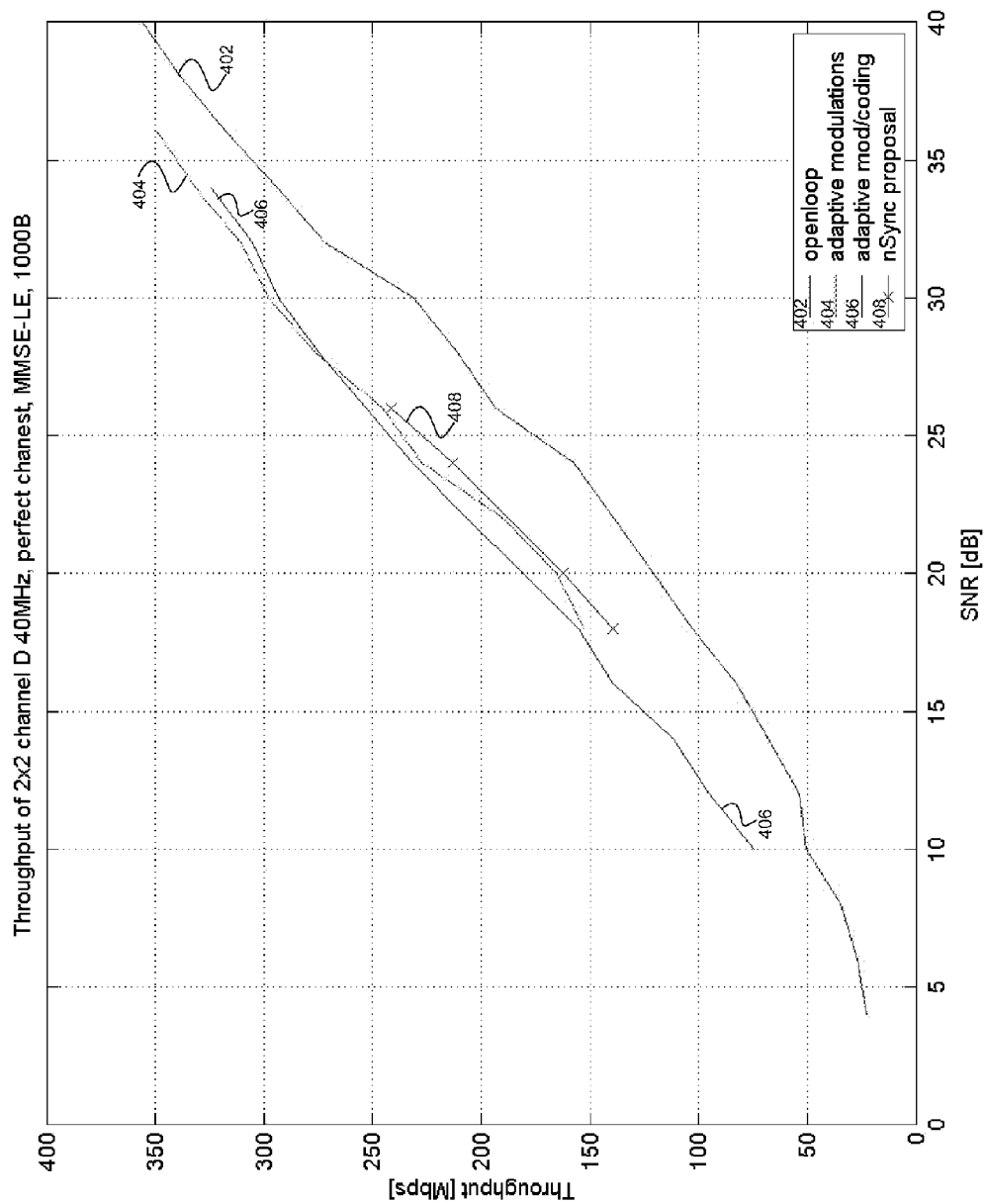
FIG. 4 shows an exemplary graph of throughput versus SNR simulations for a 2×2 system utilizing a 40 MHz D-type channel with perfect channel estimation based on MMSE-LE for packet size of 1000 bytes, in accordance with an embodiment of the invention.

FIG. 4 shows an exemplary graph of throughput versus SNR simulations for a 2×2 system utilizing a 40 MHz D-type channel with perfect channel estimation based on MMSE-LE for packet size of 1000 bytes, in accordance with an embodiment of the invention. With reference to FIG. 4 there is shown results from a simulation of an open loop system 402, results from a simulation of an adaptive modulation system 404, results from a simulation of an adaptive modulation and coding system 406, and results from a simulation of a TGn Sync (nSync) proposal 408. As illustrated in FIG. 4, for a given throughput, the SNR performance required in an adaptive modulation system 404 may be within 2 dB of the SNR performance of an adaptive modulation and coding system 406. Either the adaptive modulation system 404, or the adaptive modulation and coding system 406, may achieve a given level of throughput at a lower SNR than in the nSync proposal 408. In this regard, the adaptive modulation system 404 may represent a suitable alternative to a system that utilizes adaptive modulation and coding 406.

Figure 5:
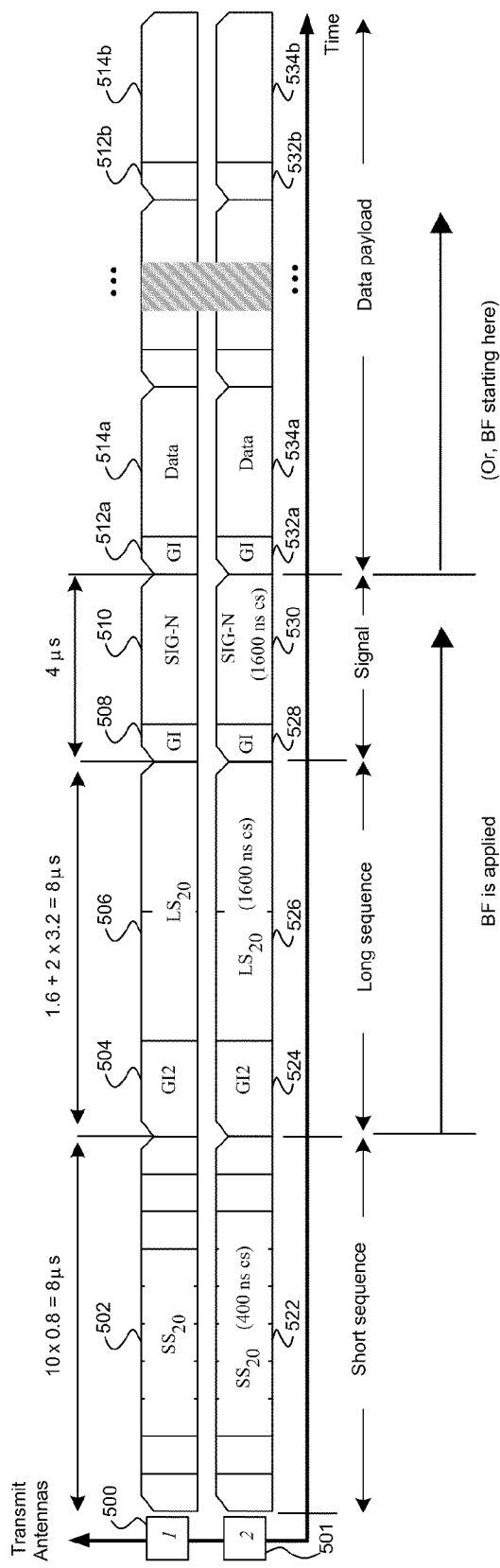
FIG. 5 shows an exemplary training sequence, which may be utilized in connection with an embodiment of the invention.

FIG. 5 illustrates an exemplary training sequence for adaptive modulations, which may be utilized in connection with an embodiment of the invention. With reference to FIG. 5, there is shown a first antenna 500, and a second antenna 501. The physical layer protocol data unit (PPDU) transmitted by the first antenna 500 may comprise a short sequence field 502, a training symbol guard interval (GI2) field 504, a long sequence field 506, a guard interval (GI) field 508, a SIG-N field 510, a plurality of guard interval fields 512a . . . 512b, and a plurality of data fields 514a . . . 514b. The message transmitted by the second antenna 501 may comprise a short sequence field 522, a training symbol guard interval field 524, a long sequence field 526, a guard interval field 528, a SIG-N field 530, a plurality of guard interval fields 532a, . . . , 532b, and a plurality of data fields 534a, . . . , 534b. A physical layer service data unit (PSDU) may comprise a header and a data payload. The preamble of the PSDU transmitted by the first antenna 500 may comprise a short sequence field 502, and a long sequence field 506. The header portion of the PSDU transmitted by the first antenna 500 may comprise the SIG-N field 510. The data payload of the PSDU transmitted by the first antenna 500 may comprise plurality of data fields 514a, . . . , 514b. The preamble to the PSDU transmitted by the second antenna 501 may comprise a short sequence field 522, and a long sequence field 526. The header portion of the PSDU transmitted by the second antenna 501 may comprise the SIG-N field 530. The data payload of the PSDU transmitted by the second antenna 501 may comprise plurality of data fields 534a, . . . , 534b.

The short sequence field 502 may comprise a plurality of short training sequence symbols, for example, 10 short training sequence symbols. Each short training sequence symbol may comprise transmission of information for a defined time interval, for example, 800 nanoseconds (ns). The duration of the short sequence field 502 may comprise a time interval, for example, 8 microseconds (μs). The short sequence field 502 may be utilized by a receiver, for example, receiver 201, for a plurality of reasons, for example, signal detection, automatic gain control (AGC) for low noise amplification circuitry, diversity selection such as performed by rake receiver circuitry, coarse frequency offset estimation, and timing synchronization.

The training symbol guard interval field 504 may comprise a time interval during which the first antenna 500 does not transmit information via an RF channel. The duration of the training symbol guard interval field 504 may comprise a time interval, for example, 1.6 µs. The training symbol guard interval field 504 may be utilized by a receiver, for example, receiver 201, to reduce the likelihood of inter-symbol interference between a preceding symbol, for example, a symbol transmitted during a short sequence field 502, and a succeeding symbol, for example, a symbol transmitted during a long sequence field 506.

The long sequence field 506 may comprise a plurality of long training symbols, for example, 2 long training symbols. Each long training symbol may comprise transmission of information for a defined time interval, for example, 3.2 µs. The duration of the long training sequence, including the duration of the long sequence field 506, and the preceding training symbol guard interval field 504, may comprise a time interval of, for example, 8 µs. The long training sequence field 506 may be utilized by a receiver, for example, receiver 201, for a plurality of reasons, for example, fine frequency offset estimation, and channel estimation.

The guard interval field 508 may comprise a time interval during which the first antenna 500 does not transmit information via an RF channel. The duration of guard interval field 508 may comprise a time interval, for example, 800 ns. The guard interval field 508 may be utilized by a receiver, for example, receiver 201, to reduce the likelihood of inter-symbol interference between a preceding symbol, for example, a symbol transmitted during a long sequence field 506, and a succeeding symbol, for example, a symbol transmitted during the signal SIG-N field 510.

The signal SIG-N field 510 may comprise, for example, a signal symbol. Each signal symbol may comprise transmission of information for a defined time interval, for example, 3.2 µs. The duration of the single symbol, including the duration of the signal SIG-N field 510, and the preceding guard interval field 508, may comprise a time interval, for example, 4 µs. The signal SIG-N field 510 may be utilized by a receiver, for example, receiver 201, to establish a plurality of configuration parameters associated with receipt of a physical layer service data unit (PSDU) via an RF channel.

The guard interval field 512*a* may comprise a time interval during which the first antenna 500 does not transmit information via an RF channel. The duration of guard interval field 512*a* may comprise a time interval, for example, 800 ns. The guard interval field 512*a* may be utilized by a receiver, for example, receiver 201, to reduce the likelihood of inter-symbol interference between a preceding symbol, for example, a symbol transmitted during a signal SIG-N field 510, and a succeeding symbol, for example, a symbol transmitted during a the data field 514*a*. Each successive guard interval field in the plurality of guard interval fields 512*a*, . . . , 512*b* may be utilized by a receiver, for example, receiver 201, to reduce the likelihood of inter-symbol interference between a preceding symbol, for example, a symbol transmitted during the plurality of data fields 514*a*, . . . , 514*b*, and a succeeding symbol in the plurality of data fields 514*a*, . . . , 514*b*.

A data field in the plurality of data fields 514*a*, . . . , 514*b* may comprise, for example, a data symbol. Each data symbol may comprise transmission, by the first antenna 500, of information for a defined time interval, for example, 3.2 µs. The duration of each data interval, including the duration of a data field in the plurality of data fields 514*a*, . . . , 514*b*, and the preceding guard interval field in the plurality of guard interval fields 512*a*, . . . , 512*b*, may comprise a time interval, for example, 4 µs. The plurality of data fields 514*a*, . . . , 514*b* may be utilized by a receiver, for example, receiver 201, receive information that is contained in a PSDU data payload received via an RF channel.

The short sequence field 522, training symbol guard interval field 524, long sequence field 526, guard interval 528, and signal SIG-N field 530 may comprise time shifted, or cyclically shifted, representations of the corresponding short sequence field 502, training symbol guard interval field 504, long sequence field 506, guard interval 508, and signal SIG-N field 510. The start of transmission of the cyclically shifted version short sequence field 522 by the second antenna 501 may precede the start of transmission of the short sequence field 502 by the first antenna 500 by an interval, for example, 400 ns. The start of transmission of the cyclically shifted version long sequence field 526 by the second antenna 501 may precede the start of transmission of the long sequence field 506 by the first antenna 500 by an interval, for example, 1600 ns. The start of transmission of the cyclically shifted version signal SIG-N field 530 by the second antenna 501 may precede the start of transmission of the signal SIG-N field 510 by the first antenna 500 by an interval, for example, 1600 ns.

The guard interval field 532*a* may comprise a time interval during which the second antenna 501 does not transmit information via an RF channel. The duration of guard interval field 532*a* may comprise a time interval, for example, 800 ns. The guard interval field 532*a* may be utilized by a receiver, for example, receiver 201, to reduce the likelihood of inter-symbol interference between a preceding symbol, for example, a symbol transmitted during a signal SIG-N field 530, and a succeeding symbol, for example, a symbol transmitted during a the data field 534*a*. Each successive guard interval field in the plurality of guard interval fields 532*a*, . . . , 532*b* may be utilized by a receiver, for example, receiver 201, to reduce the likelihood of inter-symbol interference between a preceding symbol, for example, a symbol transmitted during the plurality of data fields 534*a*, . . . , 534*b*, and a succeeding symbol in the plurality of data fields 534*a*, . . . , 534*b*.

The data field in the plurality of data fields 534*a* . . . 534*b* may comprise, for example, a data symbol. Each data symbol may comprise transmission, by the second antenna 501, of information for a defined time interval, for example, 3.2 µs. The duration of each data interval, including the duration of a data field in the plurality of data fields 534*a*, . . . , 534*b*, and the preceding guard interval field in the plurality of guard interval fields 532*a*, . . . , 532*b*, may comprise a time interval, for example, 4 µs. The plurality of data fields 534*a*, . . . , 534*b* may be utilized by a receiver, for example, receiver 201, receive information that is contained in a PSDU data payload received via an RF channel. The short sequence field 502, and the long sequence field 506, are specified in IEEE resolution 802.11.

In operation, short sequence and long sequence fields may be transmitted by the first antenna 500, of a transmitter, for example, transmitter 200, and received by a receiver, for example, receiver 201. For example, the receiver may compare a received long sequence field against the well known expected values to determine an extent to which transmission impairments may exist in the downlink channel. Channel estimates may be derived for the downlink channel. The channel estimates may comprise SNR information and may comprise information about individual spatial streams that may be transmitted via the downlink channel.

The short sequence field 522, and the long sequence field 526, are specified in IEEE resolution 802.11. The short sequence and long sequence fields may be transmitted by the second antenna 501, of a transmitter, for example, transmitter 200, and received by a receiver, for example, receiver 201. For example, the receiver may compare a received long sequence field against known expected values to determine an extent to which transmission impairments may exist in the downlink channel, and therefore, to derive channel estimates for the downlink channel. The channel estimates may comprise SNR information and may comprise information about individual spatial streams that may be transmitted via the RF or downlink channel.

The preamble portion and header portion of the PSDU transmitted by the first antenna 500 may be transmitted utilizing a known modulation type and coding rate. The utilization of a known modulation type and coding rate may enable a transmitter, for example, transmitter 200, and a receiver, for example, receiver 201, to communicate until modulation type and coding rate information has been exchanged. The modulation type may comprise binary phase shift keying (BPSK), for example. The coding rate may be represented as ½. The modulation type and coding rate may represent the lowest data rate at which data may be transmitted via a spatial stream in an RF channel. The header transmitted by the first antenna comprising the signal SIG-N field 510, and the plurality of data fields 514a . . . 514b, may comprise a physical layer protocol data unit (PPDU).

Beamforming, which may also be referred to as Eigenbeamforming, may be utilized at the beginning of the long training sequence (LTS), which may correspond to the beginning of the training symbol guard interval 504. Alternatively, beamforming may be utilized at the start of reception of the data payload, which may correspond to the beginning of the guard interval 512a. The receiver may determine that a received frame is processed utilizing adaptive modulation based on the signal SIG-N field 510. Adaptive modulation may comprise modifying at least one modulation and/or coding rate for at least one transmitted spatial stream based on channel feedback information in a closed loop MIMO system.

The preamble portion and header portion of the PSDU transmitted by the second antenna 501 may be transmitted utilizing a particular modulation type and coding rate. The utilization of a particular modulation type and coding rate may enable a transmitter, for example, transmitter 200, and a receiver, for example, receiver 201, to communicate until modulation type and coding rate information has been exchanged. The modulation type may comprise binary phase shift keying (BPSK). The coding rate may be represented as ½. The modulation type and coding rate may represent the lowest data rate at which data may be transmitted via a spatial stream in an RF channel. The header transmitted by the first antenna comprising the signal SIG-N field 530, and the plurality of data fields 534a . . . 534b, may comprise a PPDU.

Eigenbeamforming may be utilized at the beginning of the long training sequence (LTS), which may correspond to the beginning of the training symbol guard interval 524. Alternatively, beamforming may be utilized at the start of reception of the data payload, which may correspond to the beginning of the guard interval 532a. The receiver may determine that a received frame is processed utilizing adaptive modulation based on the signal SIG-N field 530. Adaptive modulation may comprise modifying at least one modulation and/or coding rate for at least one transmitted spatial stream based on channel feedback information in a closed loop MIMO system.

Figure 6:
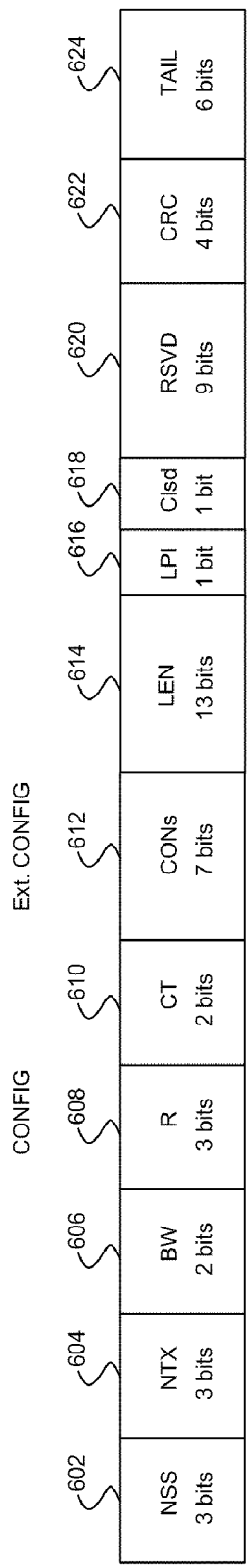
FIG. 6 shows exemplary changes to the SIG-N field, in accordance with an embodiment of the invention.

FIG. 6 illustrates an exemplary SIG-N field, in accordance with an embodiment of the invention. With reference to FIG. 6 there is shown a number of spatial streams (NSS) field 602, a number of transmitting antenna (NTX) field 604, a bandwidth (BW) field 606, a coding rate (R) field 608, an error correcting code type (CT) field 610, and a constellation types (CONs) field 612. Also illustrated in FIG. 6 is a length (LEN) field 614, a last PSDU indicator (LPI) field 616, a closed loop (Clsd) field 618, a RSVD field 620, a cyclical redundancy check (CRC) field 622, and a tail field 624.

The number of spatial streams field 602 may comprise 3 bits of binary data. The number of spatial streams field 602 may indicate the number of spatial streams utilized in transmitting information between a transmitter, for example, 200, and a receiver, for example, 201. In a MIMO system the number of spatial streams may represent a number, for example, 1, 2, 3, or 4. The number of transmitting antenna field 604 may comprise, for example, 3 bits of binary data. The number of transmitting antenna field 604 may indicate the number of transmitting antenna, for example, antenna 500, utilized in transmitting information between a transmitter and a receiver. In a MIMO system the number of transmitting antenna may represent a number, for example, 1, 2, 3, or 4. The bandwidth field 606 may comprise 2 bits of binary data. The bandwidth field 606 may indicate the bandwidth that is utilized for transmitting information between a transmitter and a receiver. In a MIMO system the bandwidth may represent a bandwidth, for example, 20 MHz, or 40 MHz, where 20 MHz may correspond to utilization of a 20 MHz RF channel, and 40 MHz may correspond to utilization of a 40 MHz RF channel. The coding rate field 608 may comprise 3 bits of binary data. The coding rate field 608 may indicate the coding rate that is utilized in transmitting a physical layer service data unit (PSDU) via an antenna. In a MIMO system, the coding rate may represent a number, for example, ½, ⅔, ¾, or ⅚. The error correcting code type field 610 may comprise 2 bits of binary data. The error correcting code type field 610 may indicate the error correcting code type that is utilized in transmitting information via an antenna. In a MIMO system, the error correcting code type may represent an error correcting coding method, for example, binary convolutional coding (BCC), or low density parity coding (LDPC). The constellation types field 612 may comprise 7 bits of binary data. The constellation types field 612 may indicate the constellation type, or modulation type, which is utilized in transmitting a PSDU in one or more spatial streams via an antenna. In a MIMO system, the modulation type may represent a constellation indicating the number of binary bits that may be encoded in a symbol, for example, binary phase shift keying (BPSK), quaternary phase shift keying (QPSK), 16 level quadrature amplitude modulation (16 QAM), 64 level QAM (64 QAM), or 256 level QAM (256 QAM).

The length field 614 may comprise information that indicates the number of binary octets of data payload information, for example, in data fields 514a, . . . , 514b transmitted via an antenna, for example antenna 500. The indicator LPI field 616 may comprise 1 bit of binary information. The indicator LPI field 616 may comprise information that indicates whether the data payload, for example, the plurality of data fields 514a . . . 514b, represent that last information comprised in a message. The closed loop field 618 may indicate whether a transmitter, for example, transmitter 200, utilized MIMO closed loop feedback information in transmitting information via an antenna. The reserved field 620 may comprise 9 bits of binary information. The reserved field 620 may have no assigned usage. The configuration field 504 may comprise 16 bits of binary information. The cyclical redundancy check field 622 may comprise 4 bits of binary information. The cyclical redundancy check field 622 may comprise information that may be utilized by a receiver, for example, receiver 201, to detect the presence of errors in a received PPDU, for example, the header SIG-N field 510, and data, for example, the plurality of data fields 514a . . . 514b. The tail field 624 may comprise 6 bits of binary information. The tail field 624 may comprise information that is appended after the cyclical redundancy check field 622 to pad the SIG-N field to a desired length.

In operation, in a closed loop MIMO system, the constellation types field 612, may be utilized by a receiver, for example, receiver 201, to select, for a plurality of spatial streams, at least one modulation type. A receiver may select a unique modulation type and/or coding rate for each of a plurality of spatial streams transmitted by an antenna, for example, antenna 500. The selected modulation types and coding rates may be communicated via an uplink channel. A transmitter, for example transmitter 200, may receive the selected modulation types and coding rates transmitted via an RF channel that comprises specification of a plurality of modulation types and/or coding rates for a plurality of spatial streams. The transmitter may be configured for transmitting subsequent data based on at least one received modulation type and/or coding rate.

The modulation and/or coding rate may comprise a specification of one of the plurality of spatial streams by the receiver, and a specification of a corresponding spatial stream transmitted as a part of at least a portion of a plurality of spatial streams by a transmitter. A transmitter may receive a specification of a plurality of modulation types and/or coding rates for a plurality of spatial streams. The transmitter may then utilize each of the plurality of modulation types and/or coding rates specified by a receiver, for a plurality of spatial streams, to transmit subsequent data utilizing a corresponding one of a plurality of transmitted spatial streams. A transmitter may receive a specification of a plurality of modulation types and/or coding rates for a plurality of spatial streams. The transmitter may then utilize at least one specified modulation type and/or coding rate to transmit subsequent data utilizing at least one spatial stream.

In one embodiment of the invention, in a closed loop MIMO system, a receiver, for example, receiver 201, may generate channel feedback information based on at least one SNR for a plurality of spatial streams. The generated channel feedback information may be communicated via an uplink channel. A transmitter, for example, transmitter 200, may receive the channel feedback information based on at least one SNR observed by the receiver for a plurality of spatial streams. The transmitter may select a plurality of modulation types and/or coding rates for a plurality of spatial streams. The transmitter may be configured for transmitting subsequent data based on at least one selected modulation type and/or coding rate that had been selected based on the channel feedback information.

In another embodiment of the invention, in an open loop MIMO system, a transmitter, for example transmitter 200, may select a plurality of modulation types and/or coding rates for a plurality of spatial streams. The transmitter may configure for transmitting subsequent data based on at least one selected modulation type and/or coding rate.

In either closed loop, or open loop, MIMO systems, the transmitter, for example, transmitter 200, may communicate to the receiver, for example, receiver 201, information comprising specification of the modulation types and/or coding rate types that were utilized in transmitting subsequent data via the signal SIG-N message field, for example, the exemplary SIG-N field shown in FIG. 6, contained in a PPDU. The constellation types field 612 may comprise specification of the modulation types utilized in a plurality of spatial streams that were transmitted via a transmitting antenna, for example, antenna 500. Whether subsequent data was transmitted utilizing a closed loop method, or an open loop method may be determined by a receiver based on the closed loop field 604.

If the closed loop field 618 Clsd=0 and the number of spatial streams (NSS), represented by the number of spatial streams field 602, is approximately equal to, or one less than, the number of transmitting antenna (NTX) represented by the number of transmitting antenna field 604, this may indicate that a transmitter, for example, the transmitter 200, may be transmitting data without utilizing beamforming, and instead utilizing spatial division multiplexing (SDM), or space-time block coding (STBC). If the closed loop field 618 Clsd=1 and the constellation types field 612 indicates that each of the NSS number of spatial streams utilizes the same modulation type, this may indicate that the transmitter may be transmitting utilizing Eigenbeamforming, and not utilizing streamloading, or utilizing individual per-stream adaptive modulation. If streamloading is not utilized, each spatial steam may utilize an equivalent modulation type, and the data rate for each spatial stream may be equivalent. If streamloading is utilized, some spatial streams may utilize different modulation types, and the data rates for some spatial streams may differ from those of other spatial streams. Adaptive modulation may enable a transmitter to adapt the data rate for a spatial stream, to increase or decrease, based on channel feedback information. In various embodiments of the invention, the modulation type, and/or coding rate, may be adapted individually for each spatial stream.

An OFDM symbol comprising a plurality of tones may be transmitted via an RF channel, where each tone may be transmitted at a frequency selected from a range of subcarrier frequencies. The SNR for a given spatial stream transmitted via an RF channel may vary by frequency such that a tone sent at frequency $f_1$ may have an $SNR_{f1}$ that is different from the SNR for a tone sent at a different frequency $f_2$, $SNR_{f2}$. An aggregate SNR may be determined for a spatial mode by computing a geometric mean SNR based upon the individual $SNR_{fi}$ from among the frequencies $f_i$ that may be transmitted via an RF channel. The aggregate geometric SNR, which may be referred to as $SNR_{geo}$, may be expressed as in the following equation:

$$SNR_{geo} = \sqrt[k]{\prod_{f_i=1}^{k} SNR_{f_i}}, \quad \text{equation [2]}$$

where k may be equal to the number of tones comprised in an OFDM symbol that may be transmitted via an RF channel, π may represent the multiplicative product of the SNRs for individual tones, and the expression in equation [2] may refer to the aggregate geometric SNR being equal to the $k^{th}$ root of the product individual SNRs from each of the k tones.

In accordance with an embodiment of the invention, a geometric SNR may be determined for each spatial mode $SNR_{geo,i}$. Upon determining each of the $SNR_{geo,i}$, an algorithm, for example, Aslanis formula may be utilized to determine a number of binary bits that may be transmitted among each of the spatial modes. For the $i^{th}$ spatial mode, the number of bits that may be transmitted at approximately the same time, $b_i$, may be calculated by Aslanis formula as in the following equation:

$$b_i = \log_2(1+SNR_{geo,i}), \text{ where} \quad \text{equation[3]}$$

the expression in equation[3] computes a base 2 logarithm for the geometric SNR for spatial mode i.

A characteristic of the singular matrix that may be generated in association with Eigenbeamforming of a plurality of spatial modes:

$$SNR_{geo,1} \geq SNR_{geo,2} \geq SNR_{geo,3} \geq SNR_{geo,4} \quad \text{equation[4]}$$

Equation[4] may suggest that the SNR for a subsequent spatial stream among a plurality of NSS spatial streams, may be less than or equal to the SNR for a preceding spatial stream. This may, based on equation[3], further suggest that the number of binary bits, $b_i$, that may be assigned to a spatial stream, i, may observe the following corresponding relationship to equation[4]:

$$b_1 \geq b_2 \geq b_3 \geq b_4 \quad \text{equation[5]}$$

A modulation type may comprise a plurality of constellation points. The number of constellation points may determine the number of binary bits that may be encoded in a symbol generated by the corresponding modulation type. For a given modulation type, the minimum number of constellation points, $CP_i$, required to encode a spatial mode comprising a plurality $b_i$ number of binary bits may be represented as:

$$CP_i \geq 2^{b_i} \quad \text{equation[6]}$$

As a result of equations [4], [5], and [6], selection of a modulation type, $M_i$, from a plurality of modulation types $M_X$, for a spatial stream, i, may enable selection of a modulation type, $M_j$, for a subsequent spatial stream, j, such that the number of constellation points for $M_j$ may be less than or equal to the number of constellation points for $M_i$. Thus, $M_j$ may be selected from a plurality of modulation types $M_Y$ where the number $M_Y$ may be less than or equal to the number $M_X$.

Equations [7] and [8] may show vectors comprising exemplary values that may be utilized to show possible combinations of modulation types among a plurality of spatial streams for NSS=4. In each equation, a modulation type may be indicated based on the number of binary bits of information that may be modulated in a single symbol. For example, in BPSK modulation a single bit of binary information may be contained in a single symbol. For example, in QPSK modulation, 2 bits of binary information may be contained in a single symbol. If no binary information is transmitted via a spatial stream a 0 may be indicated. In equations [7] and [8], each column may represent a unique combination of modulation types across spatial stream, while each row may represent an individual spatial stream. The first row may represent modulation types used in each combination for the first spatial stream. The second row may represent modulation types used in each combination for the second spatial stream. The third row may represent modulation types used in each combination for the third spatial stream. The fourth row may represent modulation types used in each combination for the fourth spatial stream.

$$\begin{bmatrix} 1 & 1 & 1 & 1 \\ 0 & 1 & 1 & 1 \\ 0 & 0 & 1 & 1 \\ 0 & 0 & 0 & 1 \end{bmatrix} \quad \text{equation [7]}$$

$$\begin{bmatrix} 2 & 2 & 2 & 2 & 2 & 2 & 2 & 2 & 2 \\ 0 & 1 & 1 & 1 & 2 & 2 & 2 & 2 & 2 \\ 0 & 0 & 1 & 1 & 0 & 1 & 1 & 2 & 2 \\ 0 & 0 & 0 & 1 & 0 & 0 & 1 & 0 & 1 & 2 \end{bmatrix} \quad \text{equation [8]}$$

As indicated in equation[7], there may be 4 combinations of coding rates when the first stream utilizes BPSK. In the first combination, BPSK modulation may be utilized in a first spatial stream with no information transmitted in spatial streams 2, 3, or 4. In the second combination, BPSK modulation may be utilized in the first and second spatial streams, with no information transmitted in spatial streams 3, or 4. As indicated in equation[8], there may be 10 combinations of coding rates when the first stream utilizes QPSK. In the seventh combination from equation[8] QPSK modulation may be utilized in spatial streams 1 and 2, while BPSK modulation may be utilized in spatial streams 3 and 4.

When the first spatial stream utilizes 16 QAM, equation[9] may show vectors comprising exemplary values that may be utilized to show possible combinations of modulation types among a plurality of spatial streams for NSS=4.

$$\begin{bmatrix} 4 & 4 & 4 & 4 & 4 & 4 & 4 & 4 & 4 & 4 & 4 & 4 & 4 & 4 & 4 & 4 & 4 & 4 & 4 & 4 \\ 0 & 1 & 1 & 1 & 2 & 2 & 2 & 2 & 2 & 2 & 4 & 4 & 4 & 4 & 4 & 4 & 4 & 4 & 4 \\ 0 & 0 & 1 & 1 & 0 & 1 & 1 & 2 & 2 & 2 & 0 & 1 & 1 & 2 & 2 & 2 & 4 & 4 & 4 & 4 \\ 0 & 0 & 0 & 1 & 0 & 0 & 1 & 0 & 1 & 2 & 0 & 0 & 1 & 0 & 1 & 2 & 0 & 1 & 2 & 4 \end{bmatrix} \quad \text{equation [9]}$$

As indicated in equation[9], there may be 20 combinations of coding rates when the first stream utilizes 16 QAM. In this case, there may be 10 combinations in which the second spatial stream utilizes 16 QAM, and another 9 combinations in which the second spatial stream utilizes QPSK or BPSK. In one combination, no information may be transmitted in spatial streams 2, 3, or 4. In the seventh combination from equation[9], 16 QAM modulation may be utilized in spatial stream 1, QPSK modulation may be utilized in spatial stream 2, while BPSK modulation may be utilized in spatial streams 3 and 4.

When the first spatial stream utilizes 64 QAM, equation [10] may show vectors comprising exemplary values that may be utilized to show possible combinations of modulation types among a plurality of spatial streams for NSS=4.

$$\begin{bmatrix} 6 & 6 & 6 & 6 & 6 & 6 & 6 & 6 & 6 & 6 & 6 & 6 & 6 & 6 & 6 & 6 & 6 & 6 & 6 & 6 & 6 & 6 & 6 & 6 & 6 & 6 & 6 & 6 & 6 & 6 & 6 & 6 & 6 & 6 & 6 \\ 0 & 1 & 1 & 1 & 2 & 2 & 2 & 2 & 2 & 2 & 4 & 4 & 4 & 4 & 4 & 4 & 4 & 4 & 4 & 4 & 6 & 6 & 6 & 6 & 6 & 6 & 6 & 6 & 6 & 6 & 6 & 6 & 6 & 6 & 6 \\ 0 & 0 & 1 & 1 & 0 & 1 & 1 & 2 & 2 & 2 & 0 & 1 & 1 & 2 & 2 & 2 & 4 & 4 & 4 & 4 & 0 & 1 & 1 & 2 & 2 & 2 & 4 & 4 & 4 & 4 & 6 & 6 & 6 & 6 & 6 \\ 0 & 0 & 0 & 1 & 0 & 0 & 1 & 0 & 1 & 2 & 0 & 0 & 1 & 0 & 1 & 2 & 0 & 1 & 2 & 4 & 0 & 0 & 1 & 0 & 1 & 2 & 0 & 1 & 2 & 4 & 0 & 1 & 2 & 4 & 6 \end{bmatrix}$$

equation [10]

As indicated in equation[10], there may be 35 combinations of coding rates when the first stream utilizes 64 QAM. In this case, there may be 15 combinations in which the second spatial stream utilizes 64 QAM, and another 19 combinations in which the second spatial stream utilizes 16 QAM, QPSK or BPSK. In one combination, no information may be transmitted in spatial streams 2, 3, or 4. In the fifteenth combination from equation[10], 64 QAM modulation may be utilized in spatial stream 1, 16 QAM modulation may be utilized in spatial stream 2, QPSK modulation may be utilized in spatial stream 3, while BPSK modulation may be utilized in spatial stream 4.

When the first spatial stream utilizes 256 QAM, equation [11] may show vectors comprising exemplary values that may be utilized to show possible combinations of modulation types among a plurality of spatial streams for NSS=4.

equation [11]

$$\begin{bmatrix} 8 & 8 & 8 & 8 & 8 & 8 & 8 & 8 & 8 & 8 & 8 & 8 & 8 & 8 & 8 & 8 & 8 & 8 & 8 & 8 & 8 & 8 & 8 & 8 & 8 & 8 & 8 & 8 \\ 0 & 1 & 1 & 1 & 2 & 2 & 2 & 2 & 2 & 2 & 4 & 4 & 4 & 4 & 4 & 4 & 4 & 4 & 4 & 4 & 6 & 6 & 6 & 6 & 6 & 6 & 6 & 6 \\ 0 & 0 & 1 & 1 & 0 & 1 & 1 & 2 & 2 & 2 & 0 & 1 & 1 & 2 & 2 & 2 & 4 & 4 & 4 & 4 & 0 & 1 & 1 & 2 & 2 & 2 & 4 & 4 \\ 0 & 0 & 0 & 1 & 0 & 0 & 1 & 0 & 1 & 2 & 0 & 0 & 1 & 0 & 1 & 2 & 0 & 1 & 2 & 4 & 0 & 0 & 1 & 0 & 1 & 2 & 0 & 1 \end{bmatrix}$$

$$\begin{bmatrix} 8 & 8 & 8 & 8 & 8 & 8 & 8 & 8 & 8 & 8 & 8 & 8 & 8 & 8 & 8 & 8 & 8 & 8 & 8 & 8 & 8 & 8 & 8 & 8 & 8 & 8 & 8 & 8 \\ 6 & 6 & 8 & 8 & 8 & 8 & 8 & 8 & 8 & 8 & 8 & 8 & 8 & 8 & 8 & 8 & 8 & 8 & 8 & 8 & 8 & 8 & 8 & 8 & 8 & 8 & 8 & 8 \\ 6 & 6 & 0 & 1 & 1 & 2 & 2 & 2 & 4 & 4 & 4 & 4 & 6 & 6 & 6 & 6 & 6 & 6 & 8 & 8 & 8 & 8 & 8 & 8 & 8 & 8 & 8 & 8 \\ 4 & 6 & 0 & 0 & 1 & 0 & 1 & 2 & 0 & 1 & 2 & 4 & 0 & 1 & 2 & 4 & 6 & 0 & 1 & 2 & 4 & 6 & 8 \end{bmatrix}$$

As indicated in equation[11], there may be 56 combinations of coding rates when the first stream utilizes 256 QAM. In this case, there may be 21 combinations in which the second spatial stream utilizes 256 QAM, and another 34 combinations in which the second spatial stream utilizes 64 QAM, 16 QAM, QPSK or BPSK. In one combination, no information may be transmitted in spatial streams 2, 3, or 4. In the thirty fifth combination from equation[11], 256 QAM modulation may be utilized in spatial stream 1, while 64 QAM modulation may be utilized in spatial streams 2, 3, and 4.

When the range of modulation types that may be utilized for a first spatial stream comprises 256 QAM, 64 QAM, 16 QAM, QPSK, or BPSK there may be a total of 125 combinations (4+10+20+35+56) of modulation types among the 4 spatial steams as indicated in equations [7], [8], [9], [10], and [11]. These 125 combinations may be uniquely identified in the constellation types field 612 utilizing 7 bits of binary information.

In a MIMO system comprising 5 modulation types and 4 spatial streams, there may be a total of 625 potential combinations of modulation types. In this regard, 10 bits of binary information may be required to uniquely identify each potential combination. Various embodiments of the invention may utilize properties of Eigenvalue analysis of MIMO systems to reduce the number of bits of binary information required to encode a modulation type among a plurality of modulation types to a spatial stream among a plurality of spatial streams. The reduction in the number of required bits in various embodiments of the invention compared to other approaches may enable greater flexibility in the signal SIG-N field. The constellation types field 612 may further be extended by utilizing bits from the reserved field in the SIG-N field.

Figure 7:
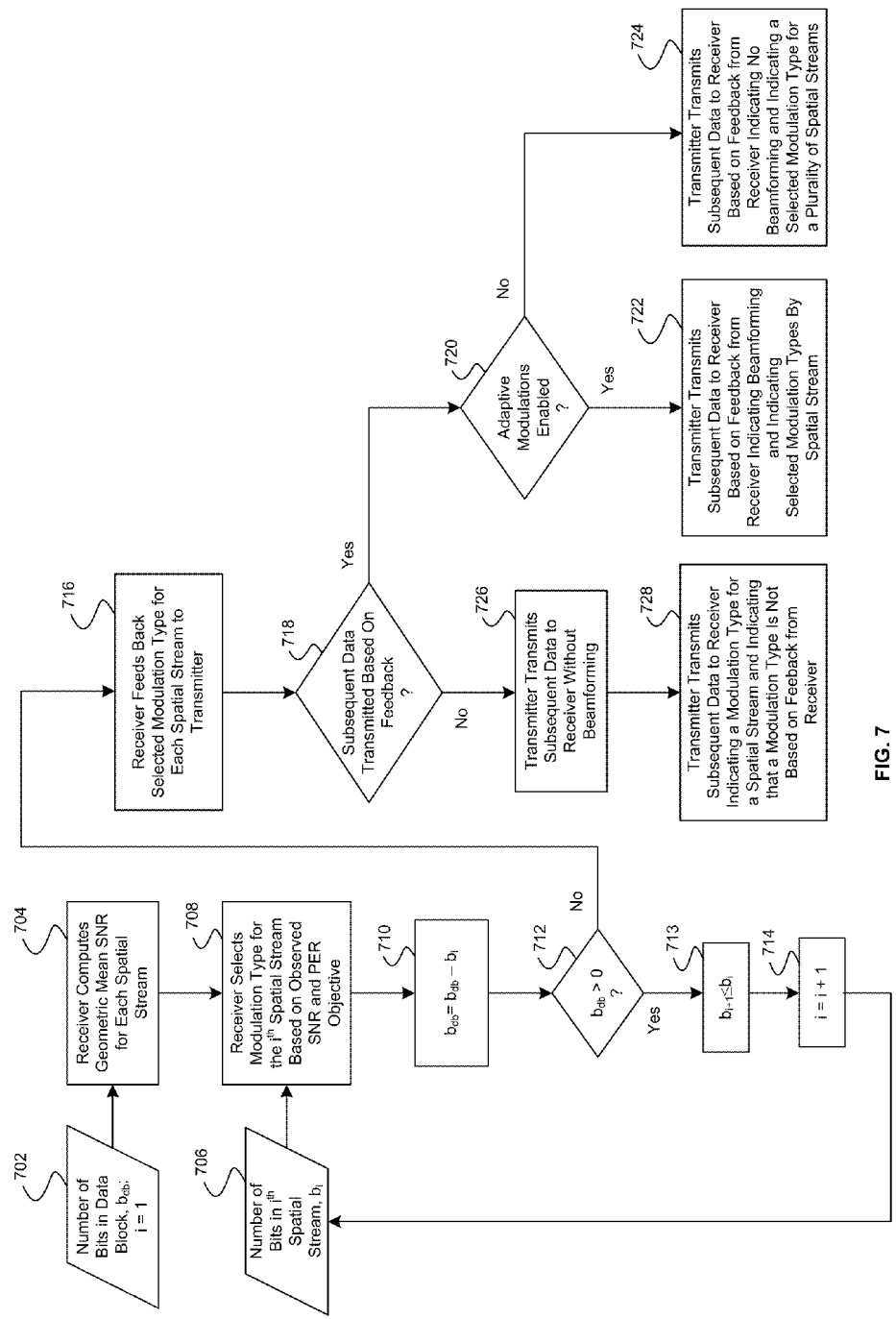
FIG. 7 is a flowchart illustrating exemplary steps for closed loop modulation type requested by a receiver, in accordance with an embodiment of the invention.

FIG. 7 is a flowchart illustrating exemplary steps for closed loop modulation type requested by a receiver, in accordance with an embodiment of the invention. In the flowchart of FIG. 7, a receiver 201 may determine a data rate by assigning a modulation type and/or coding rate per spatial stream. The modulation type and/or coding rate selections may be communicated to a transmitter 200 in a message comprising feedback information. With reference to FIG. 7, in step 702 the approximate number of bits in a data block, $b_{db}$, which may be transmitted simultaneously, may be determined. An index for an individual spatial stream, i, may be initialized to a value equal to 1. In step 704 a receiver may compute geometric mean SNRs for each spatial stream. In step 706, the number of bits, $b_i$, in the $i^{th}$ spatial stream may be determined. In step 708 a receiver may select a modulation type for the $i^{th}$ spatial stream based on observed SNR and packet error rate (PER) objectives. The selected modulation type may comprise a sufficient number of constellation points to encode the number of bits, $b_i$. In step 710 the data block variable, $b_{db}$, may be decremented by the number of bits, $b_i$, to indicate the remaining number of bits from the data block to be encoded. Step 712 may determine whether the current value of the data block variable, $b_{db}$, is greater than 0. If $b_{db}$ is greater than 0, step 713 may establish that the number of bits in a subsequent spatial stream will be less than or equal to the number of bits in the current spatial stream. Step 714 may increment the spatial stream index i by 1 to refer to the subsequent spatial stream. Step 706 may follow step 714.

If $b_{db}$ is not greater than 0, in step 716, a receiver may feed back the selected modulation type for each spatial stream to a transmitter. Step 718 may determine if subsequent data was transmitted based on feedback information. If not, in step 726 the transmitter may transmit subsequent data to a receiver without utilizing beamforming. In step 728, the transmitter may transmit subsequent data to the receiver indicating a selected modulation type for a spatial stream and indicating that the selected modulation type may not be based on feedback information from the receiver.

If step 718 determines that subsequent data was transmitted based on feedback information, step 720 may determine if adaptive modulations are enabled. If so, in step 722, the transmitter may transmit subsequent data to the receiver based on prior feedback information from the receiver, which indicates that beamforming was utilized along with the selected modulation types by spatial stream. If in step 720 it was determined that beamforming was not utilized, in step 724, the transmitter may transmit subsequent data to the receiver based on feedback information from the receiver indicting that beamforming was not utilized and indicating a modulation type selected by the receiver for a plurality of transmitted spatial streams.

Figure 8:
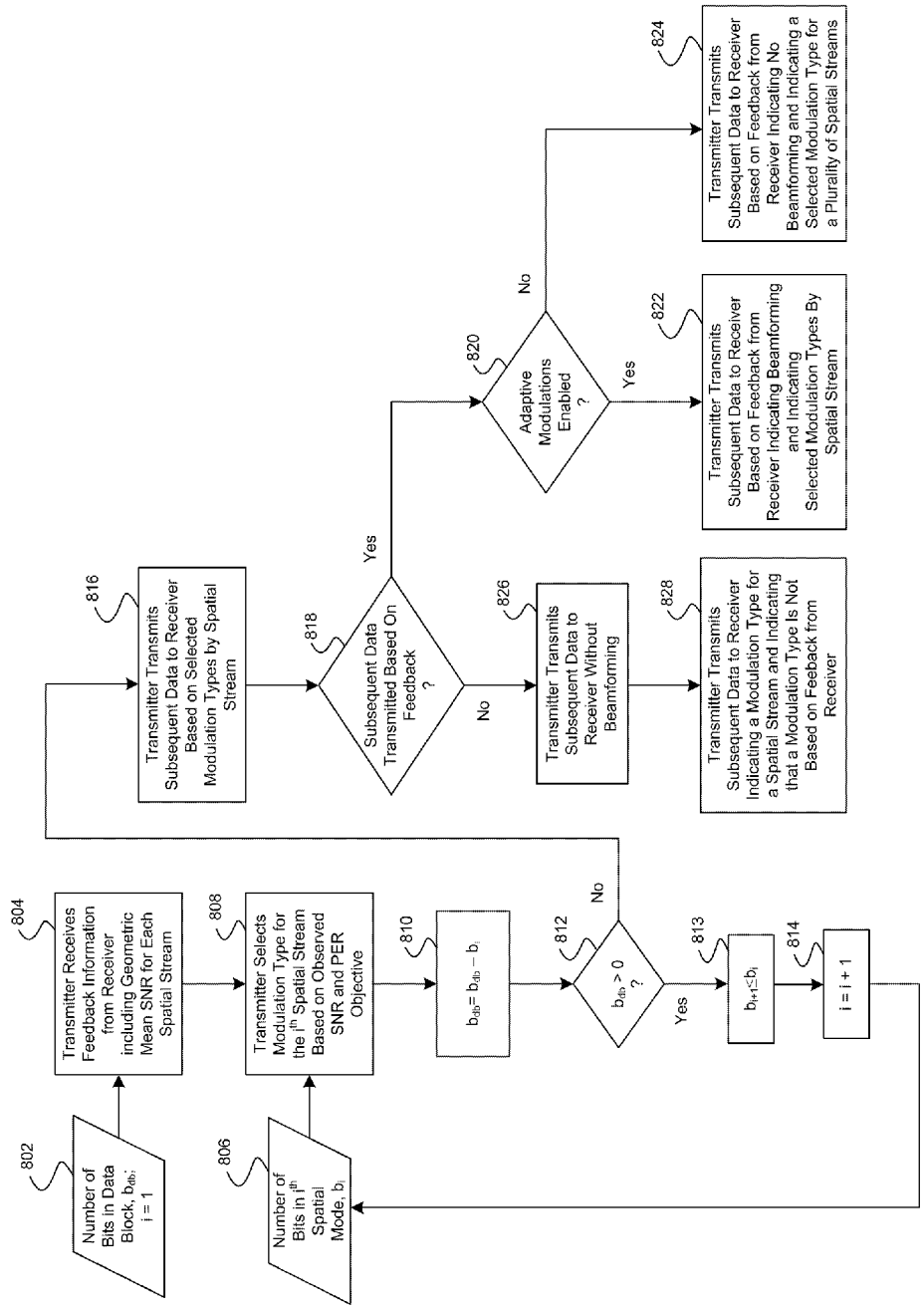
FIG. 8 is a flowchart illustrating exemplary steps for closed loop modulation type determined by a transmitter based on channel feedback from a receiver, in accordance with an embodiment of the invention.

FIG. 8 is a flowchart illustrating exemplary steps for closed loop modulation type determined by a transmitter based on channel feedback from a receiver, in accordance with an embodiment of the invention. In comparison to the flowchart illustrated in FIG. 7, where a receiver 201 may select a plurality of modulation types that are communicated as feedback information to a transmitter 200, in the flowchart illustrated in FIG. 8, the receiver may communicate SNR information to the transmitter. The transmitter may utilize the SNR information from the receiver to select a plurality of modulation types for a corresponding plurality of spatial streams. The transmitter 200 may determine a data rate by assigning a modulation type and/or coding rate per spatial stream. The flowchart of FIG. 8 may differ from the flowchart of FIG. 7 in steps 804, 808, and 816.

With reference to FIG. 8, in step 802 the approximate number of bits in a data block, $b_{db}$, which may be transmitted simultaneously, may be determined. An index for an individual spatial stream, i, may be initialized to a value equal to 1. In step 804, a transmitter may receive feedback information from the receiver that includes geometric mean SNR for each spatial stream. In step 806, the number of bits, $b_i$, in the $i^{th}$ spatial stream may be determined. In step 808 the transmitter may select a modulation type for the $i^{th}$ spatial stream based on observed SNR and packet error rate (PER) objectives. The selected modulation type may comprise a sufficient number of constellation points to encode the number of bits, $b_i$. In step 810, the data block variable, $b_{db}$, may be decremented by the number of bits, $b_i$, to indicate the remaining number of bits from the data block to be encoded. Step 812 may determine whether the current value of the data block variable, $b_{db}$, is greater than 0. If $b_{db}$ is greater than 0, step 813 may establish that the number of bits in a subsequent spatial stream will be less than or equal to the number of bits in the current spatial stream. Step 814 may increment the spatial stream index, i, by 1 to refer to the subsequent spatial stream. Step 806 may follow step 814.

If $b_{db}$ is not greater than 0, in step 816, the transmitter may transmit subsequent data to the receiver based on the selected modulation type for each spatial stream. Step 818 may determine if subsequent data was transmitted based on feedback information. If not, in step 826, the transmitter may transmit subsequent data to a receiver without utilizing beamforming. In step 828, the transmitter may transmit subsequent data to the receiver indicating a selected modulation type for a spatial stream and indicating that the selected modulation type may not be based on feedback information from the receiver.

If step 818 determines that subsequent data was transmitted based on feedback information, step 820 may determine if adaptive modulations are enabled. If so, in step 822, the transmitter may transmit subsequent data to the receiver based on prior feedback information from the receiver, which indicates that beamforming was utilized along with the selected modulation types by spatial stream. If in step 820 it was determined that beamforming was not utilized, in step 824, the transmitter may transmit subsequent data to the receiver based on feedback information from the receiver indicting that beamforming was not utilized and indicating a modulation type selected by the receiver for a plurality of transmitted spatial streams.

Figure 9:
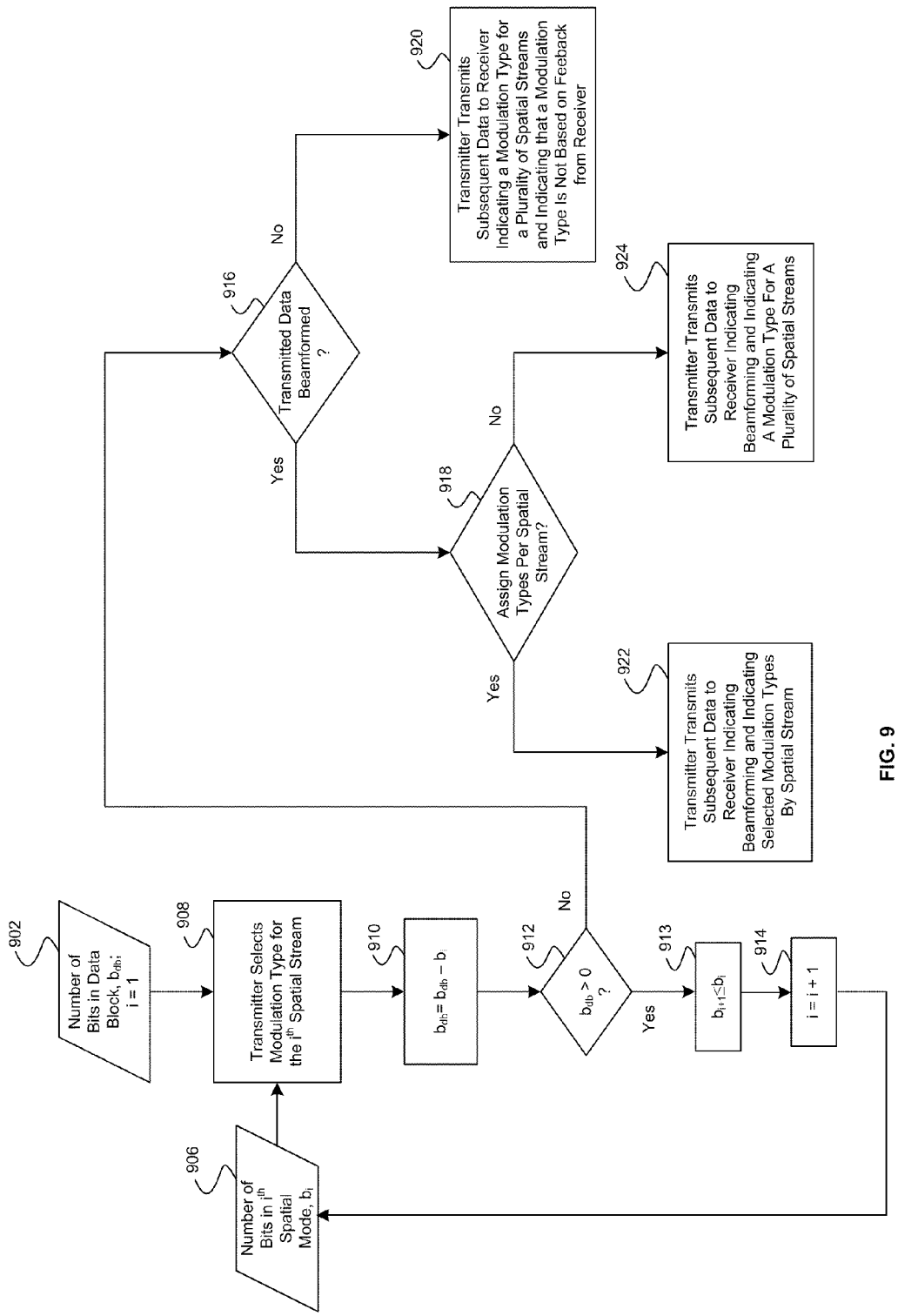
FIG. 9 is a flowchart illustrating exemplary steps for open loop modulation type determined by a transmitter, in accordance with an embodiment of the invention.

FIG. 9 is a flowchart illustrating exemplary steps for open loop modulation type determined by a transmitter, in accordance with an embodiment of the invention. In FIG. 9, the transmitter may select modulation types in an open loop MIMO system. With reference to FIG. 9, in step 902, the approximate number of bits in a data block, $b_{db}$, which may be transmitted simultaneously, may be determined. An index for an individual spatial stream, i, may be initialized to a value equal to 1. In step 906, the number of bits, $b_i$, in the $i^{th}$ spatial stream may be determined. In step 908, the transmitter may select a modulation type for the $i^{th}$ spatial stream. The selected modulation type may comprise a sufficient number of constellation points to encode the number of bits, $b_i$. In step 910, the data block variable, $b_{db}$, may be decremented by the number of bits, $b_i$, to indicate the remaining number of bits from the data block to be encoded. Step 912 may determine whether the current value of the data block variable, $b_{db}$, is greater than 0. If $b_{db}$ is greater than 0, step 913 may establish that the number of bits in a subsequent spatial stream will be less than or equal to the number of bits in the current spatial stream. Step 914 may increment the spatial stream index i by 1 to refer to a subsequent spatial stream. Step 906 may follow step 914.

If $b_{db}$ is not greater than 0, in step 916 a transmitter may determine whether to transmit data utilizing beamforming. The transmitter may make this determination based on whether beamforming is currently being utilized. The transmitter may also base the determination on the status of successfully acknowledge frames at the receiver. If beamforming is utilized, in step 918, the transmitter may determine whether to assign modulation types per spatial stream. If so, in step 922, the transmitter may transmit subsequent data to the receiver indicating beamforming, and indicating a selected modulation type per spatial stream. If beamforming is to be utilized but modulations are not to be assigned per spatial stream, in step 924 the transmitter may transmit subsequent data to the receiver indicating beamforming and indicating a modulation type for a plurality of spatial streams. If beamforming is not utilized following step 916, in step 920 the transmitter may transmit subsequent data to the receiver indicating a modulation type for a plurality of spatial streams, and indicating that a modulation type is not based on feedback from the receiver.

One embodiment of the invention may comprise a system for communicating information in a communications system in which a transmitter 200 (FIG. 2b), in a MIMO communication system utilizing a plurality of modulation types and a plurality of spatial streams, may select a current modulation type for modulating a current spatial stream to be transmitted. The transmitter may select at least one subsequent modulation type based on the selected current modulation type, for modulating at least one subsequent spatial stream to be transmitted. The transmitter may transmit a message indicating the selected current modulation type, and at least one selected subsequent modulation type, via an RF channel, to a receiver. The transmitter may also be configured to transmit subsequent data based on the selected current modulation type and/or at least one selected subsequent modulation type. The transmitter may encode a constellation field to uniquely identify a combination comprising the selected current modulation type, and at least one subsequent selected modulation type. The number of constellation points comprised in a subsequent selected modulation type may be less than or equal to the number of constellation points comprised in a selected current modulation type.

Another embodiment of the invention may comprise a system for communicating information in a communications system in which a receiver 201 (FIG. 2b), in a MIMO communication system, may select a current modulation type for modulating a current spatial stream to be transmitted. The receiver may select at least one subsequent modulation type based on the selected current modulation type, for modulating at least one subsequent spatial stream to be transmitted. The receiver may communicate a message indicating the selected current modulation type and at least one selected subsequent modulation type, via an RF channel, to a transmitter. The receiver may also configure to receive subsequent data based on the selected current modulation type and/or at least one subsequent selected modulation type. The receiver may encode a constellation field to uniquely identify a combination comprising the selected current modulation type, and at least one subsequent selected modulation type. The number of constellation points comprised in a subsequent selected modulation type may be less than or equal to the number of constellation points comprised in a selected current modulation type.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communicating information in a communications system, the method comprising:
   in a multiple-input-multiple-output (MIMO) communication system utilizing a plurality of modulation types and a plurality of spatial streams,
   determining an aggregate noise characteristic based upon a noise characteristic of each of said plurality of spatial streams; and
   configuring a receiver to receive subsequent data based on one or both of: a current modulation type for modulating a current spatial stream and at least one subsequent modulation type for modulating at least one subsequent spatial stream,
   wherein said current modulation type and said at least one subsequent modulation type are based on said determined aggregate noise characteristic.

2. The method according to claim 1, comprising encoding a constellation field to uniquely identify a combination comprising said current modulation type, and said at least one subsequent modulation type.

3. The method according to claim 1, wherein said at least one subsequent modulation type comprises a number of constellation points that is less than or equal to a number of constellation points in said current modulation type.

4. The method according to claim 1, comprising selecting one or both of: said current modulation type and said at least one subsequent modulation type, based on said determined aggregate noise characteristic.

5. The method according to claim 1, wherein said determined aggregate noise characteristic comprises at least one signal-to-noise ratio (SNR).

6. A system for communicating information in a communications system, the system comprising:
   circuitry for use in a multiple-input-multiple-output (MIMO) communication system utilizing a plurality of modulation types and a plurality of spatial streams, said circuitry operable to determine an aggregate noise characteristic based upon a noise characteristic of each of said plurality of spatial streams; and
   said circuitry operable to configure a receiver to receive subsequent data based on one or both of: a current modulation type for modulating a current spatial stream and at least one subsequent modulation type for modulating at least one subsequent spatial stream,
   wherein said current modulation type and said at least one subsequent modulation type are based on said determined aggregate noise characteristic.

7. The system according to claim 6, wherein said circuitry is operable to encode a constellation field to uniquely identify a combination comprising said current modulation type, and said at least one subsequent modulation type.

8. The system according to claim 6, wherein said at least one subsequent modulation type comprises a number of constellation points that is less than or equal to a number of constellation points in said current modulation type.

9. The system according to claim 6, wherein said circuitry is operable to select one or both of: said current modulation type and said at least one subsequent modulation type, based on said determined aggregate noise characteristic.

10. The system according to claim 6, wherein said determined aggregate noise characteristic comprises at least one signal-to-noise ratio (SNR).

11. A method for communicating information in a communications system, the method comprising:
    in a multiple-input-multiple-output (MIMO) communication system utilizing a plurality of modulation types and a plurality of spatial streams, determining an aggregate noise characteristic based upon a noise characteristic of each of said plurality of spatial streams; and configuring a transmitter to transmit subsequent data based on one or both of: a current modulation type for modulating a current spatial stream and at least one subsequent modulation type for modulating at least one subsequent spatial stream, wherein said current modulation type and said at least one subsequent modulation type are based on said determined aggregate noise characteristic.

12. The method according to claim 11, comprising encoding a constellation field to uniquely identify a combination comprising said current modulation type, and said at least one subsequent modulation type.

13. The method according to claim 11, wherein said at least one subsequent modulation type comprises a number of constellation points that is less than or equal to a number of constellation points in said current modulation type.

14. The method according to claim 11, comprising selecting one or both of: said current modulation type and said at least one subsequent modulation type, based on said determined aggregate noise characteristic.

15. The method according to claim 11, wherein said determined aggregate noise characteristic comprises at least one signal-to-noise ratio (SNR).

16. A system for communicating information in a communications system, the system comprising:

circuitry for use in a multiple-input-multiple-output (MIMO) communication system utilizing a plurality of modulation types and a plurality of spatial streams, said circuitry operable to determine an aggregate noise characteristic based upon a noise characteristic of each of said plurality of spatial streams; and said circuitry operable to configure a transmitter to transmit subsequent data based on one or both of: a current modulation type for modulating a current spatial stream and at least one subsequent modulation type for modulating at least one subsequent spatial stream, wherein said current modulation type and said at least one subsequent modulation type are based on said determined aggregate noise characteristic.

17. The system according to claim 16, wherein said circuitry is operable to encode a constellation field to uniquely identify a combination comprising said current modulation type, and said at least one subsequent modulation type.

18. The system according to claim 16, wherein said at least one subsequent modulation type comprises a number of constellation points that is less than or equal to a number of constellation points in said current modulation type.

19. The system according to claim 16, wherein said circuitry is operable to select one or both of: said current modulation type and said at least one subsequent modulation type, based on said determined aggregate noise characteristic.

20. The system according to claim 16, wherein said determined aggregate noise characteristic comprises at least one signal-to-noise ratio (SNR).

21. A method for communicating information in a communications system, the method comprising:

in a multiple-input-multiple-output (MIMO) communication system utilizing a plurality of modulation types and a plurality of spatial streams, determining an aggregate power characteristic based upon a power characteristic of each of said plurality of spatial streams; and configuring a receiver to receive subsequent data based on one or both of: a current modulation type for modulating a current spatial stream and at least one subsequent modulation type for modulating at least one subsequent spatial stream, wherein said current modulation type and said at least one subsequent modulation type are based on said determined aggregate power characteristic.

22. The method according to claim 21, comprising encoding a constellation field to uniquely identify a combination comprising said current modulation type, and said at least one subsequent modulation type.

23. The method according to claim 21, wherein said at least one subsequent modulation type comprises a number of constellation points that is less than or equal to a number of constellation points in said current modulation type.

24. The method according to claim 21, comprising selecting one or both of: said current modulation type and said at least one subsequent modulation type, based on said determined aggregate power characteristic.

25. A system for communicating information in a communications system, the system comprising:

circuitry for use in a multiple-input-multiple-output (MIMO) communication system utilizing a plurality of modulation types and a plurality of spatial streams, said circuitry operable to determine an aggregate power characteristic based upon a power characteristic of each of said plurality of spatial streams; and said circuitry operable to configure a receiver to receive subsequent data based on one or both of: a current modulation type for modulating a current spatial stream and at least one subsequent modulation type for modulating at least one subsequent spatial stream, wherein said current modulation type and said at least one subsequent modulation type are based on said determined aggregate power characteristic.

26. The system according to claim 25, wherein said circuitry is operable to encode a constellation field to uniquely identify a combination comprising said current modulation type, and said at least one subsequent modulation type.

27. The system according to claim 25, wherein said at least one subsequent modulation type comprises a number of constellation points that is less than or equal to a number of constellation points in said current modulation type.

28. The system according to claim 25, wherein said circuitry is operable to select one or both of: said current modulation type and said at least one subsequent modulation type, based on said determined aggregate power characteristic.

29. A method for communicating information in a communications system, the method comprising:

in a multiple-input-multiple-output (MIMO) communication system utilizing a plurality of modulation types and a plurality of spatial streams, determining an aggregate power characteristic based upon a power characteristic of each of said plurality of spatial streams; and configuring a transmitter to transmit subsequent data based on one or both of: a current modulation type for modulating a current spatial stream and at least one subsequent modulation type for modulating at least one subsequent spatial stream, wherein said current modulation type and said at least one subsequent modulation type are based on said determined aggregate power characteristic.

30. The method according to claim 29, comprising encoding a constellation field to uniquely identify a combination comprising said current modulation type, and said at least one subsequent modulation type.

31. The method according to claim 29, wherein said at least one subsequent modulation type comprises a number of constellation points that is less than or equal to a number of constellation points in said current modulation type.

32. The method according to claim 29, comprising selecting one or both of: said current modulation type and said at least one subsequent modulation type, based on said determined aggregate power characteristic.

33. A system for communicating information in a communications system, the system comprising:
   circuitry for use in a multiple-input-multiple-output (MIMO) communication system utilizing a plurality of modulation types and a plurality of spatial streams, said circuitry operable to determine an aggregate power characteristic based upon a power characteristic of each of said plurality of spatial streams; and
   said circuitry operable to configure a transmitter to transmit subsequent data based on one or both of: a current modulation type for modulating a current spatial stream and at least one subsequent modulation type for modulating at least one subsequent spatial stream,
   wherein said current modulation type and said at least one subsequent modulation type are based on said determined aggregate power characteristic.

34. The system according to claim 33, wherein said circuitry is operable to encode a constellation field to uniquely identify a combination comprising said current modulation type, and said at least one subsequent modulation type.

35. The system according to claim 33, wherein said at least one subsequent modulation type comprises a number of constellation points that is less than or equal to a number of constellation points in said current modulation type.

36. The system according to claim 33, wherein said circuitry is operable to select one or both of: said current modulation type and said at least one subsequent modulation type, based on said determined aggregate power characteristic.

* * * * *

UNITED STATES PATENT AND TRADEMARK OFFICE
CERTIFICATE OF CORRECTION

PATENT NO. : 8,077,669 B2  
APPLICATION NO. : 12/952275  
DATED : December 13, 2011  
INVENTOR(S) : Joonsuk Kim Page 1 of 1

It is certified that error appears in the above-identified patent and that said Letters Patent is hereby corrected as shown below:

Title Page, Item (74): Replace "McAdrews, Held & Malloy, Ltd." with --McAndrews, Held & Malloy, Ltd.--

Title Page, Item (60): After "Feb. 7, 2005" Insert --; provisional application No. 60/656357 filed on Feb. 25, 2005--

Signed and Sealed this  
Twelfth Day of March, 2013

Teresa Stanek Rea  
*Acting Director of the United States Patent and Trademark Office*